(12) United States Patent
Lien et al.

(10) Patent No.: US 11,693,092 B2
(45) Date of Patent: *Jul. 4, 2023

(54) GESTURE RECOGNITION USING MULTIPLE ANTENNA

(71) Applicant: Google LLC, Mountain View, CA (US)

(72) Inventors: Jaime Lien, Mountain View, CA (US); Nicholas Edward Gillian, Godalming (GB); Ivan Poupyrev, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/523,051

(22) Filed: Nov. 10, 2021

(65) Prior Publication Data

US 2022/0066568 A1 Mar. 3, 2022

Related U.S. Application Data

(63) Continuation of application No. 17/005,207, filed on Aug. 27, 2020, now Pat. No. 11,175,743, which is a
(Continued)

(51) Int. Cl.
*G09G 5/00* (2006.01)
*G01S 7/41* (2006.01)
(Continued)

(52) U.S. Cl.
CPC .............. *G01S 7/415* (2013.01); *A63F 13/21* (2014.09); *A63F 13/24* (2014.09); *G01S 7/4004* (2013.01);
(Continued)

(58) Field of Classification Search
CPC .. A63F 13/21; A63F 13/24; A63F 2300/8082; G01S 13/56; G01S 13/66;
(Continued)

(56) References Cited

U.S. PATENT DOCUMENTS 3,570,312 A 3/1971 Kreith
3,610,874 A 10/1971 Gagliano
(Continued)

FOREIGN PATENT DOCUMENTS

CN 1299501 6/2001
CN 1462382 12/2003
(Continued)

OTHER PUBLICATIONS

"Final Office Action", U.S. Appl. No. 17/023,122, dated Apr. 7, 2022, 12 pages.
(Continued)

*Primary Examiner* — Insa Sadio
(74) *Attorney, Agent, or Firm* — Colby Nipper PLLC

(57) ABSTRACT

Various embodiments wirelessly detect micro gestures using multiple antenna of a gesture sensor device. At times, the gesture sensor device transmits multiple outgoing radio frequency (RF) signals, each outgoing RF signal transmitted via a respective antenna of the gesture sensor device. The outgoing RF signals are configured to help capture information that can be used to identify micro-gestures performed by a hand. The gesture sensor device captures incoming RF signals generated by the outgoing RF signals reflecting off of the hand, and then analyzes the incoming RF signals to identify the micro-gesture.

40 Claims, 7 Drawing Sheets

Related U.S. Application Data continuation of application No. 15/093,533, filed on Apr. 7, 2016, now Pat. No. 10,817,065.

(60) Provisional application No. 62/237,975, filed on Oct. 6, 2015.

(51) Int. Cl.

| | |
|---|---|
| *G01S 13/56* | (2006.01) |
| *G01S 13/86* | (2006.01) |
| *H04Q 9/00* | (2006.01) |
| *G01S 13/88* | (2006.01) |
| *G06F 21/32* | (2013.01) |
| *G06F 3/04815* | (2022.01) |
| *G01S 7/40* | (2006.01) |
| *H04W 4/80* | (2018.01) |
| *G06N 20/00* | (2019.01) |
| *H04W 16/28* | (2009.01) |
| *G01S 13/90* | (2006.01) |
| *G06V 20/64* | (2022.01) |
| *G06V 40/20* | (2022.01) |
| *G06F 18/25* | (2023.01) |
| *G06F 18/28* | (2023.01) |
| *G06F 18/40* | (2023.01) |
| *G06F 18/21* | (2023.01) |
| *G06V 10/80* | (2022.01) |
| *G06F 16/245* | (2019.01) |
| *G06F 3/01* | (2006.01) |
| *G06F 21/62* | (2013.01) |
| *A63F 13/21* | (2014.01) |
| *A63F 13/24* | (2014.01) |
| *G01S 13/66* | (2006.01) |
| G08C 17/02 | (2006.01) |
| G06T 7/73 | (2017.01) |
| G01S 13/931 | (2020.01) |
| G06F 1/16 | (2006.01) |
| G06F 3/0484 | (2022.01) |
| G01S 19/42 | (2010.01) |
| G06F 3/0346 | (2013.01) |
| G06F 3/16 | (2006.01) |

(52) U.S. Cl.
CPC ............... *G01S 7/41* (2013.01); *G01S 7/412* (2013.01); *G01S 13/56* (2013.01); *G01S 13/66* (2013.01); *G01S 13/86* (2013.01); *G01S 13/867* (2013.01); *G01S 13/88* (2013.01); *G01S 13/888* (2013.01); *G01S 13/90* (2013.01); *G01S 13/904* (2019.05); *G06F 3/011* (2013.01); *G06F 3/017* (2013.01); *G06F 3/04815* (2013.01); *G06F 16/245* (2019.01); *G06F 18/217* (2023.01); *G06F 18/25* (2023.01); *G06F 18/253* (2023.01); *G06F 18/28* (2023.01); *G06F 18/41* (2023.01); *G06F 21/32* (2013.01); *G06F 21/6245* (2013.01); *G06N 20/00* (2019.01); *G06V 10/806* (2022.01); *G06V 20/64* (2022.01); *G06V 40/28* (2022.01); *H04Q 9/00* (2013.01); *H04W 4/80* (2018.02); *H04W 16/28* (2013.01); *A63F 2300/8082* (2013.01); *G01S 13/865* (2013.01); *G01S 13/931* (2013.01); *G01S 19/42* (2013.01); *G01S 2013/9322* (2020.01); *G06F 1/163* (2013.01); *G06F 3/0346* (2013.01); *G06F 3/0484* (2013.01); *G06F 3/165* (2013.01); *G06F 2203/0384* (2013.01); *G06F 2221/2105* (2013.01); *G06T 7/75* (2017.01); *G08C 17/02* (2013.01); *G08C 2201/93* (2013.01); *H04Q 2209/883* (2013.01)

(58) Field of Classification Search
CPC ........ G01S 13/86; G01S 13/865; G01S 13/88; G01S 13/888; G01S 13/90; G01S 13/904; G01S 13/931; G01S 19/42; G01S 2013/9322; G01S 13/867; G01S 13/931; G01S 7/4004; G01S 7/41; G01S 7/412; G01S 7/415; G06F 1/163; G06F 16/245; G06F 21/32; G06F 21/6245; G06F 2203/0384; G06F 2221/2105; G06F 3/011; G06F 3/017; G06F 3/0346; G06F 3/04815; G06F 3/0484; G06F 3/165; G06N 20/00; G06K 9/6254; G06K 9/6255; G06K 9/6262; G06K 9/6288; G06K 9/629; G06T 7/75; G06V 10/806; G06V 20/64; G06V 40/28; G08C 17/02; G08C 2201/93; H04Q 2209/883; H04Q 9/00; H04W 16/28; H04W 4/80

See application file for complete search history.

(56) References Cited

U.S. PATENT DOCUMENTS

| | | |
|---|---|---|
| 3,752,017 A | 8/1973 | Lloyd et al. |
| 3,953,706 A | 4/1976 | Harris et al. |
| 4,104,012 A | 8/1978 | Ferrante |
| 4,321,930 A | 3/1982 | Jobsis et al. |
| 4,654,967 A | 4/1987 | Thenner |
| 4,700,044 A | 10/1987 | Hokanson et al. |
| 4,795,998 A | 1/1989 | Dunbar et al. |
| 4,838,797 A | 6/1989 | Dodier |
| 5,016,500 A | 5/1991 | Conrad et al. |
| 5,024,533 A | 6/1991 | Egawa et al. |
| 5,121,124 A | 6/1992 | Spivey et al. |
| 5,298,715 A | 3/1994 | Chalco et al. |
| 5,309,916 A | 5/1994 | Hatschek |
| 5,341,979 A | 8/1994 | Gupta |
| 5,410,471 A | 4/1995 | Alyfuku et al. |
| 5,564,571 A | 10/1996 | Zanotti |
| 5,656,798 A | 8/1997 | Kubo et al. |
| 5,724,707 A | 3/1998 | Kirk et al. |
| 5,798,798 A | 8/1998 | Rector et al. |
| 6,032,450 A | 3/2000 | Blum |
| 6,037,893 A | 3/2000 | Lipman |
| 6,080,690 A | 6/2000 | Lebby et al. |
| 6,101,431 A | 8/2000 | Niwa et al. |
| 6,129,673 A | 10/2000 | Fraden |
| 6,179,785 B1 | 1/2001 | Martinosky et al. |
| 6,210,771 B1 | 4/2001 | Post et al. |
| 6,254,544 B1 | 7/2001 | Hayashi |
| 6,303,924 B1 | 10/2001 | Adan et al. |
| 6,313,825 B1 | 11/2001 | Gilbert |
| 6,340,979 B1 | 1/2002 | Beaton et al. |
| 6,380,882 B1 | 4/2002 | Hegnauer |
| 6,386,757 B1 | 5/2002 | Konno |
| 6,440,593 B2 | 8/2002 | Ellison et al. |
| 6,492,980 B2 | 12/2002 | Sandbach |
| 6,493,933 B1 | 12/2002 | Post et al. |
| 6,513,833 B2 | 2/2003 | Breed et al. |
| 6,513,970 B1 | 2/2003 | Tabata et al. |
| 6,524,239 B1 | 2/2003 | Reed et al. |
| 6,543,668 B1 | 4/2003 | Fujii et al. |
| 6,616,613 B1 | 9/2003 | Goodman |
| 6,711,354 B2 | 3/2004 | Kameyama |
| 6,717,065 B2 | 4/2004 | Hosaka et al. |
| 6,802,720 B2 | 10/2004 | Weiss et al. |
| 6,805,672 B2 | 10/2004 | Martin et al. |
| 6,833,807 B2 | 12/2004 | Flacke et al. |
| 6,835,898 B2 | 12/2004 | Eldridge et al. |
| 6,854,985 B1 | 2/2005 | Weiss |
| 6,929,484 B2 | 8/2005 | Weiss et al. |
| 6,970,128 B1 | 11/2005 | Dwelly et al. |
| 6,997,882 B1 | 2/2006 | Parker et al. |
| 7,019,682 B1 | 3/2006 | Louberg et al. |
| 7,134,879 B2 | 11/2006 | Sugimoto et al. |

(56) References Cited

U.S. PATENT DOCUMENTS

| | | |
|---|---|---|
| 7,158,076 B2 | 1/2007 | Fiore et al. |
| 7,164,820 B2 | 1/2007 | Eves et al. |
| 7,194,371 B1 | 3/2007 | McBride et al. |
| 7,205,932 B2 | 4/2007 | Fiore |
| 7,209,775 B2 | 4/2007 | Bae et al. |
| 7,223,105 B2 | 5/2007 | Weiss et al. |
| 7,230,610 B2 | 6/2007 | Jung et al. |
| 7,249,954 B2 | 7/2007 | Weiss |
| 7,266,532 B2 | 9/2007 | Sutton et al. |
| 7,299,964 B2 | 11/2007 | Jayaraman et al. |
| 7,310,236 B2 | 12/2007 | Takahashi et al. |
| 7,317,416 B2 | 1/2008 | Flom et al. |
| 7,348,285 B2 | 3/2008 | Dhawan et al. |
| 7,365,031 B2 | 4/2008 | Swallow et al. |
| 7,421,061 B2 | 9/2008 | Boese et al. |
| 7,462,035 B2 | 12/2008 | Lee et al. |
| 7,528,082 B2 | 5/2009 | Krans et al. |
| 7,544,627 B2 | 6/2009 | Tao et al. |
| 7,578,195 B2 | 8/2009 | DeAngelis et al. |
| 7,644,488 B2 | 1/2010 | Aisenbrey |
| 7,647,093 B2 | 1/2010 | Bojovic et al. |
| 7,670,144 B2 | 3/2010 | Ito et al. |
| 7,677,729 B2 | 3/2010 | Vilser et al. |
| 7,691,067 B2 | 4/2010 | Westbrook et al. |
| 7,698,154 B2 | 4/2010 | Marchosky |
| 7,750,841 B2 | 7/2010 | Oswald et al. |
| 7,791,700 B2 | 9/2010 | Bellamy |
| 7,834,276 B2 | 11/2010 | Chou et al. |
| 7,845,023 B2 | 12/2010 | Swatee |
| 7,941,676 B2 | 5/2011 | Glaser |
| 7,952,512 B1 | 5/2011 | Delker et al. |
| 7,999,722 B2 | 8/2011 | Beeri et al. |
| 8,062,220 B2 | 11/2011 | Kurtz et al. |
| 8,063,815 B2 | 11/2011 | Valo et al. |
| 8,169,404 B1 | 5/2012 | Boillot |
| 8,179,604 B1 | 5/2012 | Prada Gomez et al. |
| 8,193,929 B1 | 6/2012 | Siu et al. |
| 8,199,104 B2 | 6/2012 | Park et al. |
| 8,282,232 B2 | 10/2012 | Hsu et al. |
| 8,289,185 B2 | 10/2012 | Alonso |
| 8,301,232 B2 | 10/2012 | Albert et al. |
| 8,314,732 B2 | 11/2012 | Oswald et al. |
| 8,326,313 B2 | 12/2012 | McHenry et al. |
| 8,334,226 B2 | 12/2012 | Nhan et al. |
| 8,341,762 B2 | 1/2013 | Balzano |
| 8,344,949 B2 | 1/2013 | Moshfeghi |
| 8,367,942 B2 | 2/2013 | Howell et al. |
| 8,374,668 B1 | 2/2013 | Hayter et al. |
| 8,475,367 B1 | 7/2013 | Yuen et al. |
| 8,505,474 B2 | 8/2013 | Kang et al. |
| 8,509,882 B2 | 8/2013 | Albert et al. |
| 8,514,221 B2 | 8/2013 | King et al. |
| 8,527,146 B1 | 9/2013 | Jackson et al. |
| 8,549,829 B2 | 10/2013 | Song et al. |
| 8,560,972 B2 | 10/2013 | Wilson |
| 8,562,526 B2 | 10/2013 | Heneghan et al. |
| 8,569,189 B2 | 10/2013 | Bhattacharya et al. |
| 8,576,110 B2 | 11/2013 | Valentine |
| 8,614,689 B2 | 12/2013 | Nishikawa et al. |
| 8,655,004 B2 | 2/2014 | Prest et al. |
| 8,700,137 B2 | 4/2014 | Albert |
| 8,758,020 B2 | 6/2014 | Burdea et al. |
| 8,759,713 B2 | 6/2014 | Sheats |
| 8,764,651 B2 | 7/2014 | Tran |
| 8,785,778 B2 | 7/2014 | Streeter et al. |
| 8,790,257 B2 | 7/2014 | Libbus et al. |
| 8,814,574 B2 | 8/2014 | Selby et al. |
| 8,819,812 B1 | 8/2014 | Weber et al. |
| 8,854,433 B1 | 10/2014 | Rafii |
| 8,860,602 B2 | 10/2014 | Nohara et al. |
| 8,921,473 B1 | 12/2014 | Hyman |
| 8,926,509 B2 | 1/2015 | Magar et al. |
| 8,948,839 B1 | 2/2015 | Longinotti-Buitoni et al. |
| 9,055,879 B2 | 6/2015 | Selby et al. |
| 9,075,429 B1 | 7/2015 | Karakotsios et al. |
| 9,093,289 B2 | 7/2015 | Vicard et al. |
| 9,125,456 B2 | 9/2015 | Chow |
| 9,141,194 B1 | 9/2015 | Keyes et al. |
| 9,148,949 B2 | 9/2015 | Zhou et al. |
| 9,223,494 B1 | 12/2015 | DeSalvo et al. |
| 9,229,102 B1 | 1/2016 | Wright et al. |
| 9,230,160 B1 | 1/2016 | Kanter |
| 9,235,241 B2 | 1/2016 | Newham et al. |
| 9,316,727 B2 | 4/2016 | Sentelle et al. |
| 9,331,422 B2 | 5/2016 | Nazzaro et al. |
| 9,335,825 B2 | 5/2016 | Rautiainen et al. |
| 9,346,167 B2 | 5/2016 | O'Connor et al. |
| 9,354,709 B1 | 5/2016 | Heller et al. |
| 9,412,273 B2 | 8/2016 | Ricci |
| 9,508,141 B2 | 11/2016 | Khachaturian et al. |
| 9,511,877 B2 | 12/2016 | Masson |
| 9,524,597 B2 | 12/2016 | Ricci |
| 9,569,001 B2 | 2/2017 | Mistry et al. |
| 9,575,560 B2 | 2/2017 | Poupyrev et al. |
| 9,582,933 B1 | 2/2017 | Mosterman et al. |
| 9,588,625 B2 | 3/2017 | Poupyrev |
| 9,594,443 B2 | 3/2017 | VanBlon et al. |
| 9,600,080 B2 | 3/2017 | Poupyrev |
| 9,693,592 B2 | 7/2017 | Robinson et al. |
| 9,699,663 B1 | 7/2017 | Jovancevic |
| 9,729,986 B2 | 8/2017 | Crawley et al. |
| 9,746,551 B2 | 8/2017 | Scholten et al. |
| 9,766,742 B2 | 9/2017 | Papakostas |
| 9,778,749 B2 | 10/2017 | Poupyrev |
| 9,807,619 B2 | 10/2017 | Tsai et al. |
| 9,811,164 B2 | 11/2017 | Poupyrev |
| 9,817,109 B2 | 11/2017 | Saboo et al. |
| 9,837,760 B2 | 12/2017 | Karagozler et al. |
| 9,848,780 B1 | 12/2017 | DeBusschere et al. |
| 9,870,056 B1 | 1/2018 | Yao |
| 9,921,660 B2 | 3/2018 | Poupyrev |
| 9,933,908 B2 | 4/2018 | Poupyrev |
| 9,947,080 B2 | 4/2018 | Nguyen et al. |
| 9,958,541 B2 | 5/2018 | Kishigami et al. |
| 9,971,414 B2 | 5/2018 | Gollakota et al. |
| 9,971,415 B2 | 5/2018 | Poupyrev et al. |
| 9,983,747 B2 | 5/2018 | Poupyrev |
| 9,994,233 B2 | 6/2018 | Diaz-Jimenez et al. |
| 10,016,162 B1 | 7/2018 | Rogers et al. |
| 10,027,923 B1 | 7/2018 | Chang |
| 10,034,630 B2 | 7/2018 | Lee et al. |
| 10,063,427 B1 | 8/2018 | Brown |
| 10,064,582 B2 | 9/2018 | Rogers |
| 10,073,590 B2 | 9/2018 | Dascola et al. |
| 10,080,528 B2 | 9/2018 | DeBusschere et al. |
| 10,082,950 B2 | 9/2018 | Lapp |
| 10,088,908 B1 | 10/2018 | Poupyrev et al. |
| 10,139,916 B2 | 11/2018 | Poupyrev |
| 10,155,274 B2 | 12/2018 | Robinson et al. |
| 10,175,781 B2 | 1/2019 | Karagozler et al. |
| 10,203,405 B2 | 2/2019 | Mazzaro et al. |
| 10,203,763 B2 | 2/2019 | Poupyrev et al. |
| 10,222,469 B1 | 3/2019 | Gillian et al. |
| 10,241,581 B2 | 3/2019 | Lien et al. |
| 10,268,321 B2 | 4/2019 | Poupyrev |
| 10,285,456 B2 | 5/2019 | Poupyrev et al. |
| 10,300,370 B1 | 5/2019 | Amihood et al. |
| 10,304,567 B2 | 5/2019 | Kitagawa et al. |
| 10,310,620 B2 | 6/2019 | Lien et al. |
| 10,310,621 B1 | 6/2019 | Lien et al. |
| 10,376,195 B1 | 8/2019 | Reid et al. |
| 10,379,621 B2 | 8/2019 | Schwesig et al. |
| 10,401,490 B2 | 9/2019 | Gillian et al. |
| 10,409,385 B2 | 9/2019 | Poupyrev |
| 10,459,080 B1 | 10/2019 | Schwesig et al. |
| 10,492,302 B2 | 11/2019 | Karagozler et al. |
| 10,496,182 B2 | 12/2019 | Lien et al. |
| 10,503,883 B1 | 12/2019 | Gillian et al. |
| 10,509,478 B2 | 12/2019 | Poupyrev et al. |
| 10,540,001 B1 | 1/2020 | Poupyrev et al. |
| 10,572,027 B2 | 2/2020 | Poupyrev et al. |
| 10,579,150 B2 | 3/2020 | Gu et al. |
| 10,642,367 B2 | 5/2020 | Poupyrev |
| 10,660,379 B2 | 5/2020 | Poupyrev et al. |

(56) References Cited

U.S. PATENT DOCUMENTS

| | | |
|---|---|---|
| 10,664,059 B2 | 5/2020 | Poupyrev |
| 10,664,061 B2 | 5/2020 | Poupyrev |
| 10,705,185 B1 | 7/2020 | Lien et al. |
| 10,768,712 B2 | 9/2020 | Schwesig et al. |
| 10,817,065 B1 | 10/2020 | Lien et al. |
| 10,817,070 B2 | 10/2020 | Lien et al. |
| 10,823,841 B1 | 11/2020 | Lien et al. |
| 10,908,696 B2 | 2/2021 | Amihood et al. |
| 10,931,934 B2 | 2/2021 | Richards et al. |
| 10,936,081 B2 | 3/2021 | Poupyrev |
| 10,936,085 B2 | 3/2021 | Poupyrev et al. |
| 10,948,996 B2 | 3/2021 | Poupyrev et al. |
| 11,080,556 B1 | 8/2021 | Gillian et al. |
| 11,103,015 B2 | 8/2021 | Poupyrev et al. |
| 11,132,065 B2 | 9/2021 | Gillian et al. |
| 11,140,787 B2 | 10/2021 | Karagozler et al. |
| 11,169,988 B2 | 11/2021 | Poupyrev et al. |
| 11,175,743 B2 | 11/2021 | Lien et al. |
| 11,221,682 B2 | 1/2022 | Poupyrev |
| 11,256,335 B2 | 2/2022 | Poupyrev et al. |
| 11,385,721 B2 | 7/2022 | Lien et al. |
| 11,481,040 B2 | 10/2022 | Gillian et al. |
| 11,592,909 B2 | 2/2023 | Poupyrev et al. |
| 2001/0030624 A1 | 10/2001 | Schwoegler |
| 2001/0035836 A1 | 11/2001 | Miceli et al. |
| 2002/0009972 A1 | 1/2002 | Amento et al. |
| 2002/0080156 A1 | 6/2002 | Abbott et al. |
| 2002/0170897 A1 | 11/2002 | Hall |
| 2003/0005030 A1 | 1/2003 | Sutton et al. |
| 2003/0036685 A1 | 2/2003 | Goodman |
| 2003/0071750 A1 | 4/2003 | Benitz |
| 2003/0093000 A1 | 5/2003 | Nishio et al. |
| 2003/0100228 A1 | 5/2003 | Bungo et al. |
| 2003/0119391 A1 | 6/2003 | Swallow et al. |
| 2003/0122677 A1 | 7/2003 | Kail |
| 2004/0008137 A1 | 1/2004 | Hassebrock et al. |
| 2004/0009729 A1 | 1/2004 | Hill et al. |
| 2004/0046736 A1 | 3/2004 | Pryor et al. |
| 2004/0102693 A1 | 5/2004 | DeBusschere et al. |
| 2004/0157662 A1 | 8/2004 | Tsuchiya |
| 2004/0249250 A1 | 12/2004 | McGee et al. |
| 2004/0259391 A1 | 12/2004 | Jung et al. |
| 2005/0069695 A1 | 3/2005 | Jung et al. |
| 2005/0128124 A1 | 6/2005 | Greneker et al. |
| 2005/0148876 A1 | 7/2005 | Endoh et al. |
| 2005/0195330 A1 | 9/2005 | Zacks |
| 2005/0231419 A1 | 10/2005 | Mitchell |
| 2005/0267366 A1 | 12/2005 | Murashita et al. |
| 2006/0035554 A1 | 2/2006 | Glaser et al. |
| 2006/0040739 A1 | 2/2006 | Wells |
| 2006/0047386 A1 | 3/2006 | Kanevsky et al. |
| 2006/0061504 A1 | 3/2006 | Leach, Jr. et al. |
| 2006/0100517 A1 | 5/2006 | Phillips |
| 2006/0125803 A1 | 6/2006 | Westerman et al. |
| 2006/0136997 A1 | 6/2006 | Telek et al. |
| 2006/0139162 A1 | 6/2006 | Flynn |
| 2006/0139314 A1 | 6/2006 | Bell |
| 2006/0148351 A1 | 7/2006 | Tao et al. |
| 2006/0157734 A1 | 7/2006 | Onodero et al. |
| 2006/0166620 A1 | 7/2006 | Sorensen |
| 2006/0170584 A1 | 8/2006 | Romero et al. |
| 2006/0183980 A1 | 8/2006 | Yang |
| 2006/0209021 A1 | 9/2006 | Yoo et al. |
| 2006/0244654 A1 | 11/2006 | Cheng et al. |
| 2006/0258205 A1 | 11/2006 | Locher et al. |
| 2006/0284757 A1 | 12/2006 | Zemany |
| 2007/0024488 A1 | 2/2007 | Zemany et al. |
| 2007/0024946 A1 | 2/2007 | Panasyuk et al. |
| 2007/0026695 A1 | 2/2007 | Lee et al. |
| 2007/0027369 A1 | 2/2007 | Pagnacco et al. |
| 2007/0030195 A1 | 2/2007 | Steinway et al. |
| 2007/0118043 A1 | 5/2007 | Oliver et al. |
| 2007/0161921 A1 | 7/2007 | Rausch |
| 2007/0164896 A1 | 7/2007 | Suzuki et al. |
| 2007/0176821 A1 | 8/2007 | Flom et al. |
| 2007/0192647 A1 | 8/2007 | Glaser |
| 2007/0197115 A1 | 8/2007 | Eves et al. |
| 2007/0197878 A1 | 8/2007 | Shklarski |
| 2007/0210074 A1 | 9/2007 | Maurer et al. |
| 2007/0237423 A1 | 10/2007 | Tico et al. |
| 2007/0276262 A1 | 11/2007 | Banet et al. |
| 2007/0276632 A1 | 11/2007 | Banet et al. |
| 2008/0001735 A1 | 1/2008 | Tran |
| 2008/0002027 A1 | 1/2008 | Kondo et al. |
| 2008/0015422 A1 | 1/2008 | Wessel |
| 2008/0024438 A1 | 1/2008 | Collins et al. |
| 2008/0039731 A1 | 2/2008 | McCombie et al. |
| 2008/0059578 A1 | 3/2008 | Albertson et al. |
| 2008/0065291 A1 | 3/2008 | Breed |
| 2008/0074307 A1 | 3/2008 | Boric-Lubecke et al. |
| 2008/0122796 A1 | 5/2008 | Jobs et al. |
| 2008/0134102 A1 | 6/2008 | Movold et al. |
| 2008/0136775 A1 | 6/2008 | Conant |
| 2008/0168396 A1 | 7/2008 | Matas et al. |
| 2008/0168403 A1 | 7/2008 | Westerman et al. |
| 2008/0194204 A1 | 8/2008 | Duet et al. |
| 2008/0194975 A1 | 8/2008 | MacQuarrie et al. |
| 2008/0211766 A1 | 9/2008 | Westerman et al. |
| 2008/0233822 A1 | 9/2008 | Swallow et al. |
| 2008/0278450 A1 | 11/2008 | Lashina |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0002220 A1 | 1/2009 | Lovberg et al. |
| 2009/0018408 A1 | 1/2009 | Ouchi et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0203244 A1 | 8/2009 | Toonder |
| 2009/0226043 A1 | 9/2009 | Angell et al. |
| 2009/0253585 A1 | 10/2009 | Diatchenko et al. |
| 2009/0270690 A1 | 10/2009 | Roos et al. |
| 2009/0278915 A1 | 11/2009 | Kramer et al. |
| 2009/0288762 A1 | 11/2009 | Wolfel |
| 2009/0292468 A1 | 11/2009 | Wu et al. |
| 2009/0295712 A1 | 12/2009 | Ritzau |
| 2009/0299197 A1 | 12/2009 | Antonelli et al. |
| 2009/0303100 A1 | 12/2009 | Zemany |
| 2009/0319181 A1 | 12/2009 | Khosravy et al. |
| 2010/0013676 A1 | 1/2010 | Do et al. |
| 2010/0045513 A1 | 2/2010 | Pett et al. |
| 2010/0050133 A1 | 2/2010 | Nishihara et al. |
| 2010/0053151 A1 | 3/2010 | Marti et al. |
| 2010/0060570 A1 | 3/2010 | Underkoffler et al. |
| 2010/0065320 A1 | 3/2010 | Urano |
| 2010/0069730 A1 | 3/2010 | Bergstrom et al. |
| 2010/0071205 A1 | 3/2010 | Graumann et al. |
| 2010/0094141 A1 | 4/2010 | Puswella |
| 2010/0107099 A1 | 4/2010 | Frazier et al. |
| 2010/0109938 A1 | 5/2010 | Oswald et al. |
| 2010/0152600 A1 | 6/2010 | Droitcour et al. |
| 2010/0179820 A1 | 7/2010 | Harrison et al. |
| 2010/0198067 A1 | 8/2010 | Mahfouz et al. |
| 2010/0201586 A1 | 8/2010 | Michalk |
| 2010/0204550 A1 | 8/2010 | Heneghan et al. |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1 | 9/2010 | Petkie |
| 2010/0002912 A1 | 10/2010 | Solinsky |
| 2010/0281438 A1 | 11/2010 | Latta et al. |
| 2010/0292549 A1 | 11/2010 | Schuler |
| 2010/0306713 A1 | 12/2010 | Geisner et al. |
| 2010/0313414 A1 | 12/2010 | Sheats |

(56) References Cited

U.S. PATENT DOCUMENTS

| | | |
|---|---|---|
| 2010/0324384 A1 | 12/2010 | Moon et al. |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0018795 A1 | 1/2011 | Jang |
| 2011/0029038 A1 | 2/2011 | Hyde et al. |
| 2011/0073353 A1 | 3/2011 | Lee et al. |
| 2011/0083111 A1 | 4/2011 | Forutanpour et al. |
| 2011/0093820 A1 | 4/2011 | Zhang et al. |
| 2011/0118564 A1 | 5/2011 | Sankai |
| 2011/0119640 A1 | 5/2011 | Berkes et al. |
| 2011/0166940 A1 | 7/2011 | Bangera et al. |
| 2011/0181509 A1* | 7/2011 | Rautiainen ............. G01S 13/56 345/158 |
| 2011/0181510 A1 | 7/2011 | Hakala et al. |
| 2011/0193939 A1 | 8/2011 | Vassigh et al. |
| 2011/0197263 A1 | 8/2011 | Stinson, III |
| 2011/0202404 A1 | 8/2011 | van der Riet |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0242305 A1 | 10/2011 | Peterson et al. |
| 2011/0245688 A1 | 10/2011 | Arora et al. |
| 2011/0279303 A1 | 11/2011 | Smith |
| 2011/0286585 A1 | 11/2011 | Hodge |
| 2011/0303341 A1 | 12/2011 | Meiss et al. |
| 2011/0307842 A1 | 12/2011 | Chiang et al. |
| 2011/0316888 A1 | 12/2011 | Sachs et al. |
| 2011/0318985 A1 | 12/2011 | McDermid |
| 2012/0001875 A1 | 1/2012 | Li et al. |
| 2012/0013571 A1 | 1/2012 | Yeh et al. |
| 2012/0019168 A1 | 1/2012 | Noda et al. |
| 2012/0029369 A1 | 2/2012 | Icove et al. |
| 2012/0047468 A1 | 2/2012 | Santos et al. |
| 2012/0068876 A1 | 3/2012 | Bangera et al. |
| 2012/0069043 A1 | 3/2012 | Narita et al. |
| 2012/0075958 A1 | 3/2012 | Hintz |
| 2012/0092284 A1 | 4/2012 | Rofougaran et al. |
| 2012/0105358 A1 | 5/2012 | Momeyer et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0146950 A1 | 6/2012 | Park et al. |
| 2012/0150493 A1 | 6/2012 | Casey et al. |
| 2012/0154313 A1 | 6/2012 | Au et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0182222 A1 | 7/2012 | Moloney |
| 2012/0191223 A1 | 7/2012 | Dharwada et al. |
| 2012/0193801 A1 | 8/2012 | Gross et al. |
| 2012/0200600 A1 | 8/2012 | Demaine |
| 2012/0220835 A1 | 8/2012 | Chung |
| 2012/0243374 A1 | 9/2012 | Dahl et al. |
| 2012/0248093 A1 | 10/2012 | Ulrich et al. |
| 2012/0254810 A1 | 10/2012 | Heck et al. |
| 2012/0268310 A1 | 10/2012 | Kim |
| 2012/0268416 A1 | 10/2012 | Pirogov et al. |
| 2012/0270564 A1 | 10/2012 | Gum et al. |
| 2012/0276849 A1 | 11/2012 | Hyde et al. |
| 2012/0280900 A1 | 11/2012 | Wang et al. |
| 2012/0298748 A1 | 11/2012 | Factor et al. |
| 2012/0310665 A1 | 12/2012 | Xu et al. |
| 2013/0016070 A1 | 1/2013 | Starner et al. |
| 2013/0027218 A1 | 1/2013 | Schwarz et al. |
| 2013/0035563 A1 | 2/2013 | Angellides |
| 2013/0046544 A1 | 2/2013 | Kay et al. |
| 2013/0053653 A1 | 2/2013 | Cuddihy et al. |
| 2013/0076649 A1 | 3/2013 | Myers et al. |
| 2013/0076788 A1 | 3/2013 | Ben Zvi |
| 2013/0078624 A1 | 3/2013 | Holmes et al. |
| 2013/0079649 A1 | 3/2013 | Mestha et al. |
| 2013/0082922 A1 | 4/2013 | Miller |
| 2013/0083173 A1 | 4/2013 | Geisner et al. |
| 2013/0086533 A1 | 4/2013 | Stienstra |
| 2013/0096439 A1 | 4/2013 | Lee et al. |
| 2013/0102217 A1 | 4/2013 | Jeon |
| 2013/0104084 A1 | 4/2013 | Mlyniec et al. |
| 2013/0106710 A1 | 5/2013 | Ashbrook |
| 2013/0113647 A1 | 5/2013 | Sentelle et al. |
| 2013/0113830 A1 | 5/2013 | Suzuki |
| 2013/0117377 A1 | 5/2013 | Miller |
| 2013/0132931 A1 | 5/2013 | Bruns et al. |
| 2013/0147833 A1 | 6/2013 | Aubauer et al. |
| 2013/0150735 A1 | 6/2013 | Cheng |
| 2013/0154919 A1 | 6/2013 | An et al. |
| 2013/0161078 A1 | 6/2013 | Li |
| 2013/0169471 A1 | 7/2013 | Lynch |
| 2013/0176161 A1 | 7/2013 | Derham et al. |
| 2013/0176258 A1 | 7/2013 | Dahl et al. |
| 2013/0194173 A1 | 8/2013 | Zhu et al. |
| 2013/0195330 A1 | 8/2013 | Kim et al. |
| 2013/0196716 A1 | 8/2013 | Muhammad |
| 2013/0207962 A1 | 8/2013 | Oberdorfer et al. |
| 2013/0222232 A1 | 8/2013 | Kong et al. |
| 2013/0229508 A1 | 9/2013 | Li et al. |
| 2013/0241765 A1 | 9/2013 | Kozma et al. |
| 2013/0245986 A1 | 9/2013 | Grokop et al. |
| 2013/0249793 A1 | 9/2013 | Zhu et al. |
| 2013/0253029 A1 | 9/2013 | Jain et al. |
| 2013/0260630 A1 | 10/2013 | Ito et al. |
| 2013/0263029 A1 | 10/2013 | Rossi et al. |
| 2013/0278499 A1 | 10/2013 | Anderson |
| 2013/0278501 A1 | 10/2013 | Bulzacki |
| 2013/0281024 A1 | 10/2013 | Rofougaran et al. |
| 2013/0283203 A1 | 10/2013 | Batraski et al. |
| 2013/0310700 A1 | 11/2013 | Wiard et al. |
| 2013/0322729 A1 | 12/2013 | Mestha et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0022108 A1 | 1/2014 | Alberth et al. |
| 2014/0028539 A1 | 1/2014 | Newham et al. |
| 2014/0035737 A1 | 2/2014 | Rashid et al. |
| 2014/0049487 A1 | 2/2014 | Konertz et al. |
| 2014/0050354 A1 | 2/2014 | Heim et al. |
| 2014/0051941 A1 | 2/2014 | Messerschmidt |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0097979 A1 | 4/2014 | Nohara et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139430 A1 | 5/2014 | Leung |
| 2014/0139616 A1 | 5/2014 | Pinter et al. |
| 2014/0143678 A1 | 5/2014 | Mistry et al. |
| 2014/0145955 A1 | 5/2014 | Gomez et al. |
| 2014/0149859 A1 | 5/2014 | Van Dyken et al. |
| 2014/0181509 A1 | 6/2014 | Liu |
| 2014/0184496 A1 | 7/2014 | Gribetz et al. |
| 2014/0184499 A1 | 7/2014 | Kim |
| 2014/0188989 A1 | 7/2014 | Stekkelpak et al. |
| 2014/0191939 A1 | 7/2014 | Penn et al. |
| 2014/0200416 A1 | 7/2014 | Kashef et al. |
| 2014/0201690 A1 | 7/2014 | Holz |
| 2014/0203080 A1 | 7/2014 | Hintz |
| 2014/0208275 A1 | 7/2014 | Mongia et al. |
| 2014/0215389 A1* | 7/2014 | Walsh ................... G06F 3/0487 715/808 |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0265642 A1 | 9/2014 | Utley et al. |
| 2014/0270698 A1 | 9/2014 | Luna et al. |

(56) References Cited

U.S. PATENT DOCUMENTS

| | | |
|---|---|---|
| 2014/0275854 A1 | 9/2014 | Venkatraman et al. |
| 2014/0276104 A1 | 9/2014 | Tao et al. |
| 2014/0280295 A1 | 9/2014 | Kurochikin et al. |
| 2014/0281975 A1 | 9/2014 | Anderson |
| 2014/0282877 A1 | 9/2014 | Mahaffey et al. |
| 2014/0297006 A1 | 10/2014 | Sadhu |
| 2014/0298266 A1 | 10/2014 | Lapp |
| 2014/0300506 A1 | 10/2014 | Alton et al. |
| 2014/0306936 A1 | 10/2014 | Dahl et al. |
| 2014/0309855 A1 | 10/2014 | Tran |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0329567 A1 | 11/2014 | Chan et al. |
| 2014/0333467 A1 | 11/2014 | Inomata |
| 2014/0343392 A1 | 11/2014 | Yang |
| 2014/0347295 A1 | 11/2014 | Kim et al. |
| 2014/0357369 A1 | 12/2014 | Callens et al. |
| 2014/0368378 A1 | 12/2014 | Crain et al. |
| 2014/0368441 A1 | 12/2014 | Touloumtzis |
| 2014/0376788 A1 | 12/2014 | Xu et al. |
| 2015/0002391 A1 | 1/2015 | Chen |
| 2015/0009096 A1 | 1/2015 | Lee et al. |
| 2015/0026815 A1 | 1/2015 | Barrett |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0046183 A1 | 2/2015 | Cireddu |
| 2015/0062033 A1 | 3/2015 | Ishihara |
| 2015/0068069 A1 | 3/2015 | Tran et al. |
| 2015/0077282 A1 | 3/2015 | Mohamadi |
| 2015/0077345 A1 | 3/2015 | Hwang et al. |
| 2015/0084855 A1 | 3/2015 | Song et al. |
| 2015/0085060 A1 | 3/2015 | Fish et al. |
| 2015/0091820 A1 | 4/2015 | Rosenberg et al. |
| 2015/0091858 A1 | 4/2015 | Rosenberg et al. |
| 2015/0091859 A1 | 4/2015 | Rosenberg et al. |
| 2015/0091903 A1 | 4/2015 | Costello et al. |
| 2015/0095987 A1 | 4/2015 | Potash et al. |
| 2015/0099941 A1 | 4/2015 | Tran |
| 2015/0100328 A1 | 4/2015 | Kress et al. |
| 2015/0106770 A1 | 4/2015 | Shah et al. |
| 2015/0109164 A1 | 4/2015 | Takaki |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |
| 2015/0177374 A1 | 6/2015 | Driscoll et al. |
| 2015/0177866 A1 | 6/2015 | Hwang et al. |
| 2015/0185314 A1 | 7/2015 | Corcos et al. |
| 2015/0199045 A1 | 7/2015 | Robucci et al. |
| 2015/0204973 A1 | 7/2015 | Nohara et al. |
| 2015/0205358 A1 | 7/2015 | Lyren |
| 2015/0223733 A1 | 8/2015 | Al-Alusi |
| 2015/0226004 A1 | 8/2015 | Thompson |
| 2015/0229885 A1 | 8/2015 | Offenhaeuser |
| 2015/0256763 A1 | 9/2015 | Niemi |
| 2015/0257653 A1 | 9/2015 | Hyde et al. |
| 2015/0261320 A1 | 9/2015 | Leto |
| 2015/0268027 A1 | 9/2015 | Gerdes |
| 2015/0268799 A1 | 9/2015 | Starner et al. |
| 2015/0276925 A1 | 10/2015 | Scholten et al. |
| 2015/0277569 A1 | 10/2015 | Sprenger et al. |
| 2015/0280102 A1 | 10/2015 | Tajitsu et al. |
| 2015/0285906 A1 | 10/2015 | Hooper et al. |
| 2015/0287187 A1 | 10/2015 | Redtel |
| 2015/0297105 A1 | 10/2015 | Pahlevan et al. |
| 2015/0301167 A1 | 10/2015 | Sentelle et al. |
| 2015/0312041 A1 | 10/2015 | Choi |
| 2015/0314780 A1 | 11/2015 | Stenneth et al. |
| 2015/0317518 A1 | 11/2015 | Fujimaki et al. |
| 2015/0323993 A1 | 11/2015 | Levesque et al. |
| 2015/0332075 A1 | 11/2015 | Burch |
| 2015/0341550 A1 | 11/2015 | Lay |
| 2015/0346701 A1 | 12/2015 | Gordon et al. |
| 2015/0346820 A1 | 12/2015 | Poupyrev et al. |
| 2015/0350902 A1 | 12/2015 | Baxley et al. |
| 2015/0351703 A1 | 12/2015 | Phillips et al. |
| 2015/0370250 A1 | 12/2015 | Bachrach et al. |
| 2015/0375339 A1 | 12/2015 | Sterling et al. |
| 2016/0011668 A1 | 1/2016 | Gilad-Bachrach et al. |
| 2016/0018948 A1 | 1/2016 | Parvarandeh et al. |
| 2016/0026253 A1 | 1/2016 | Bradski et al. |
| 2016/0026768 A1 | 1/2016 | Singh et al. |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0042169 A1 | 2/2016 | Polehn |
| 2016/0045706 A1 | 2/2016 | Gary et al. |
| 2016/0048235 A1 | 2/2016 | Poupyrev |
| 2016/0048236 A1 | 2/2016 | Poupyrev |
| 2016/0048672 A1 | 2/2016 | Lux et al. |
| 2016/0054792 A1 | 2/2016 | Poupyrev |
| 2016/0054803 A1 | 2/2016 | Poupyrev |
| 2016/0054804 A1 | 2/2016 | Gollakata et al. |
| 2016/0055201 A1 | 2/2016 | Poupyrev et al. |
| 2016/0075015 A1 | 3/2016 | Izhikevich et al. |
| 2016/0075016 A1 | 3/2016 | Laurent et al. |
| 2016/0077202 A1 | 3/2016 | Hirvonen et al. |
| 2016/0085296 A1 | 3/2016 | Mo et al. |
| 2016/0089042 A1 | 3/2016 | Saponas et al. |
| 2016/0090839 A1 | 3/2016 | Stolarcyzk |
| 2016/0096270 A1 | 4/2016 | Ibarz Gabardos et al. |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0124579 A1 | 5/2016 | Tokutake |
| 2016/0131741 A1 | 5/2016 | Park |
| 2016/0140872 A1 | 5/2016 | Palmer et al. |
| 2016/0145776 A1 | 5/2016 | Roh |
| 2016/0146931 A1 | 5/2016 | Rao et al. |
| 2016/0170491 A1 | 6/2016 | Jung |
| 2016/0171293 A1 | 6/2016 | Li et al. |
| 2016/0186366 A1 | 6/2016 | McMaster |
| 2016/0206244 A1 | 7/2016 | Rogers |
| 2016/0213331 A1 | 7/2016 | Gil et al. |
| 2016/0216825 A1 | 7/2016 | Forutanpour |
| 2016/0220152 A1 | 8/2016 | Meriheina et al. |
| 2016/0234365 A1 | 8/2016 | Alameh et al. |
| 2016/0238696 A1 | 8/2016 | Hintz |
| 2016/0249698 A1 | 9/2016 | Berzowska et al. |
| 2016/0252607 A1 | 9/2016 | Saboo et al. |
| 2016/0252965 A1 | 9/2016 | Mandella et al. |
| 2016/0253044 A1 | 9/2016 | Katz |
| 2016/0259037 A1 | 9/2016 | Molchanov et al. |
| 2016/0262685 A1 | 9/2016 | Wagner et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0287172 A1 | 10/2016 | Morris et al. |
| 2016/0291143 A1 | 10/2016 | Cao et al. |
| 2016/0299526 A1 | 10/2016 | Inagaki et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0321428 A1 | 11/2016 | Rogers |
| 2016/0338599 A1 | 11/2016 | DeBusschere et al. |
| 2016/0345638 A1 | 12/2016 | Robinson et al. |
| 2016/0349790 A1 | 12/2016 | Connor |
| 2016/0349845 A1 | 12/2016 | Poupyrev et al. |
| 2016/0377712 A1 | 12/2016 | Wu et al. |
| 2017/0011210 A1 | 1/2017 | Cheong et al. |
| 2017/0013417 A1 | 1/2017 | Zampini, II |
| 2017/0029985 A1 | 2/2017 | Tajitsu et al. |
| 2017/0052618 A1 | 2/2017 | Lee et al. |
| 2017/0060254 A1 | 3/2017 | Molchanov et al. |
| 2017/0060298 A1 | 3/2017 | Hwang et al. |
| 2017/0075481 A1 | 3/2017 | Chou et al. |
| 2017/0075496 A1 | 3/2017 | Rosenberg et al. |
| 2017/0097413 A1 | 4/2017 | Gillian et al. |
| 2017/0097684 A1 | 4/2017 | Lien |

(56) References Cited

U.S. PATENT DOCUMENTS

| | | | |
|---|---|---|---|
| 2017/0115777 | A1 | 4/2017 | Poupyrev |
| 2017/0124407 | A1 | 5/2017 | Micks et al. |
| 2017/0125940 | A1 | 5/2017 | Karagozler et al. |
| 2017/0131395 | A1 | 5/2017 | Reynolds et al. |
| 2017/0164904 | A1 | 6/2017 | Kirenko |
| 2017/0168630 | A1 | 6/2017 | Khoshkava et al. |
| 2017/0192523 | A1 | 7/2017 | Poupyrev |
| 2017/0192629 | A1 | 7/2017 | Takada et al. |
| 2017/0196513 | A1 | 7/2017 | Longinotti-Buitoni et al. |
| 2017/0224280 | A1 | 8/2017 | Bozkurt et al. |
| 2017/0231089 | A1 | 8/2017 | Van Keymeulen |
| 2017/0232538 | A1 | 8/2017 | Robinson et al. |
| 2017/0233903 | A1 | 8/2017 | Jeon |
| 2017/0249033 | A1 | 8/2017 | Podhajny et al. |
| 2017/0258366 | A1 | 9/2017 | Tupin et al. |
| 2017/0291301 | A1 | 10/2017 | Gabardos et al. |
| 2017/0322633 | A1 | 11/2017 | Shen et al. |
| 2017/0325337 | A1 | 11/2017 | Karagozler et al. |
| 2017/0325518 | A1 | 11/2017 | Poupyrev et al. |
| 2017/0329412 | A1 | 11/2017 | Schwesig et al. |
| 2017/0329425 | A1 | 11/2017 | Karagozler et al. |
| 2017/0356992 | A1 | 12/2017 | Scholten et al. |
| 2018/0000354 | A1 | 1/2018 | DeBusschere et al. |
| 2018/0000355 | A1 | 1/2018 | DeBusschere et al. |
| 2018/0004301 | A1 | 1/2018 | Poupyrev |
| 2018/0005766 | A1 | 1/2018 | Fairbanks et al. |
| 2018/0046258 | A1 | 2/2018 | Poupyrev |
| 2018/0095541 | A1 | 4/2018 | Gribetz et al. |
| 2018/0106897 | A1 | 4/2018 | Shouldice et al. |
| 2018/0113032 | A1 | 4/2018 | Dickey et al. |
| 2018/0157330 | A1 | 6/2018 | Gu et al. |
| 2018/0160943 | A1 | 6/2018 | Fyfe et al. |
| 2018/0177464 | A1 | 6/2018 | DeBusschere et al. |
| 2018/0196527 | A1 | 7/2018 | Poupyrev et al. |
| 2018/0256106 | A1 | 9/2018 | Rogers et al. |
| 2018/0296163 | A1 | 10/2018 | DeBusschere et al. |
| 2018/0321841 | A1 | 11/2018 | Lapp |
| 2019/0030713 | A1 | 1/2019 | Gabardos et al. |
| 2019/0033981 | A1 | 1/2019 | Poupyrev |
| 2019/0138109 | A1 | 5/2019 | Poupyrev et al. |
| 2019/0155396 | A1 | 5/2019 | Lien et al. |
| 2019/0208837 | A1 | 7/2019 | Poupyrev et al. |
| 2019/0232156 | A1 | 8/2019 | Amihood et al. |
| 2019/0243464 | A1 | 8/2019 | Lien et al. |
| 2019/0257939 | A1 | 8/2019 | Schwesig et al. |
| 2019/0278379 | A1 | 9/2019 | Gribetz et al. |
| 2019/0321719 | A1 | 10/2019 | Gillian et al. |
| 2019/0391667 | A1 | 12/2019 | Poupyrev |
| 2019/0394884 | A1 | 12/2019 | Karagozler et al. |
| 2020/0064471 | A1 | 2/2020 | Gatland et al. |
| 2020/0064924 | A1 | 2/2020 | Poupyrev et al. |
| 2020/0089314 | A1 | 3/2020 | Poupyrev et al. |
| 2020/0150776 | A1 | 5/2020 | Poupyrev et al. |
| 2020/0218361 | A1 | 7/2020 | Poupyrev |
| 2020/0229515 | A1 | 7/2020 | Poupyrev et al. |
| 2020/0264765 | A1 | 8/2020 | Poupyrev et al. |
| 2020/0278422 | A1 | 9/2020 | Lien et al. |
| 2020/0326708 | A1 | 10/2020 | Wang et al. |
| 2020/0393912 | A1 | 12/2020 | Lien et al. |
| 2020/0409472 | A1 | 12/2020 | Lien et al. |
| 2021/0096653 | A1 | 4/2021 | Amihood et al. |
| 2021/0132702 | A1 | 5/2021 | Poupyrev |
| 2021/0326642 | A1 | 10/2021 | Gillian et al. |
| 2021/0365124 | A1 | 11/2021 | Gillian et al. |
| 2022/0019291 | A1 | 1/2022 | Lien et al. |
| 2022/0043519 | A1 | 2/2022 | Poupyrev et al. |
| 2022/0058188 | A1 | 2/2022 | Poupyrev et al. |
| 2022/0066567 | A1 | 3/2022 | Lien et al. |

FOREIGN PATENT DOCUMENTS

| | | |
|---|---|---|
| CN | 1862601 | 11/2006 |
| CN | 101349943 | 1/2009 |
| CN | 101636711 | 1/2010 |
| CN | 101751126 | 6/2010 |
| CN | 101910781 | 12/2010 |
| CN | 102031615 | 4/2011 |
| CN | 102160471 | 8/2011 |
| CN | 102184020 | 9/2011 |
| CN | 102414641 | 4/2012 |
| CN | 102473032 | 5/2012 |
| CN | 102782612 | 11/2012 |
| CN | 102819315 | 12/2012 |
| CN | 102893327 | 1/2013 |
| CN | 106342197 | 2/2013 |
| CN | 202887794 | 4/2013 |
| CN | 103076911 | 5/2013 |
| CN | 103091667 | 5/2013 |
| CN | 103502911 | 1/2014 |
| CN | 103534664 | 1/2014 |
| CN | 102660988 | 3/2014 |
| CN | 103675868 | 3/2014 |
| CN | 103907405 | 7/2014 |
| CN | 104035552 | 9/2014 |
| CN | 104094194 | 10/2014 |
| CN | 104115118 | 10/2014 |
| CN | 104838336 | 8/2015 |
| CN | 103355860 | 1/2016 |
| CN | 106154270 | 11/2016 |
| DE | 10011263 | 9/2001 |
| DE | 102011075725 | 11/2012 |
| DE | 102013201359 | 7/2014 |
| EP | 0161895 | 11/1985 |
| EP | 1785744 | 5/2007 |
| EP | 1815788 | 8/2007 |
| EP | 2177017 | 4/2010 |
| EP | 2417908 | 2/2012 |
| EP | 2637081 | 9/2013 |
| EP | 2770408 | 8/2014 |
| EP | 2014165476 | 10/2014 |
| EP | 2953007 | 12/2015 |
| EP | 2923642 | 3/2017 |
| EP | 3201726 | 8/2017 |
| FR | 3017722 | 8/2015 |
| GB | 2070469 | 9/1981 |
| GB | 2443208 | 4/2008 |
| JP | 113860 | 4/1999 |
| JP | 11168268 | 6/1999 |
| JP | H11168268 | 6/1999 |
| JP | H11237477 | 8/1999 |
| JP | 2001208828 | 8/2001 |
| JP | 2003500759 | 1/2003 |
| JP | 2003280049 | 10/2003 |
| JP | 2005231450 | 9/2005 |
| JP | 2006514382 | 4/2006 |
| JP | 2006163886 | 6/2006 |
| JP | 2006234716 | 9/2006 |
| JP | 2007011873 | 1/2007 |
| JP | 2007132768 | 5/2007 |
| JP | 2007266772 | 10/2007 |
| JP | 2007333385 | 12/2007 |
| JP | 2008287714 | 11/2008 |
| JP | 2008293501 | 12/2008 |
| JP | 2009037434 | 2/2009 |
| JP | 2010048583 | 3/2010 |
| JP | 2010049583 | 3/2010 |
| JP | 2011003202 | 1/2011 |
| JP | 2011086114 | 4/2011 |
| JP | 2011253241 | 12/2011 |
| JP | 2012068854 | 4/2012 |
| JP | 201218583 | 9/2012 |
| JP | 2012185833 | 9/2012 |
| JP | 2012198916 | 10/2012 |
| JP | 2012208714 | 10/2012 |
| JP | 2013016060 | 1/2013 |
| JP | 2013037674 | 2/2013 |
| JP | 2013196047 | 9/2013 |
| JP | 2013251913 | 12/2013 |
| JP | 2014503873 | 2/2014 |
| JP | 2014532332 | 12/2014 |
| JP | 2015507263 | 3/2015 |
| JP | 2015509634 | 3/2015 |
| JP | 2021085256 | 6/2021 |
| KR | 1020080102516 | 11/2008 |

(56) References Cited

FOREIGN PATENT DOCUMENTS

| | | |
|---|---|---|
| KR | 100987650 | 10/2010 |
| KR | 20130045222 | 5/2013 |
| KR | 20130137005 | 12/2013 |
| KR | 1020130137005 | 12/2013 |
| KR | 20140027837 | 3/2014 |
| KR | 20140053988 | 5/2014 |
| KR | 1020140055985 | 5/2014 |
| KR | 20140138779 | 12/2014 |
| KR | 20150002718 | 1/2015 |
| KR | 101999712 | 1/2017 |
| KR | 101914850 | 10/2018 |
| TW | 201425974 | 7/2014 |
| WO | 9001895 | 3/1990 |
| WO | 0130123 | 4/2001 |
| WO | 2001027855 | 4/2001 |
| WO | 0175778 | 10/2001 |
| WO | 2002082999 | 10/2002 |
| WO | 2004004557 | 1/2004 |
| WO | 2004053601 | 6/2004 |
| WO | 2005103863 | 11/2005 |
| WO | 2007125298 | 11/2007 |
| WO | 2009032073 | 3/2009 |
| WO | 2009083467 | 7/2009 |
| WO | 2009148064 | 12/2009 |
| WO | 2010032173 | 3/2010 |
| WO | 2010101697 | 9/2010 |
| WO | 2012026013 | 3/2012 |
| WO | 2012064847 | 5/2012 |
| WO | 2012152476 | 11/2012 |
| WO | 2013082806 | 6/2013 |
| WO | 2013084108 | 6/2013 |
| WO | 2013137412 | 9/2013 |
| WO | 2013154864 | 10/2013 |
| WO | 2013186696 | 12/2013 |
| WO | 2013191657 | 12/2013 |
| WO | 2013192166 | 12/2013 |
| WO | 2014019085 | 2/2014 |
| WO | 2014032984 | 3/2014 |
| WO | 2014085369 | 6/2014 |
| WO | 2014116968 | 7/2014 |
| WO | 2014124520 | 8/2014 |
| WO | 2014136027 | 9/2014 |
| WO | 2014138280 | 9/2014 |
| WO | 2014160893 | 10/2014 |
| WO | 2014165476 | 10/2014 |
| WO | 2014204323 | 12/2014 |
| WO | 2015017931 | 2/2015 |
| WO | 2015018675 | 2/2015 |
| WO | 2015022671 | 2/2015 |
| WO | 2015099796 | 7/2015 |
| WO | 2015149049 | 10/2015 |
| WO | 2016053624 | 4/2016 |
| WO | 2016118534 | 7/2016 |
| WO | 2016154560 | 9/2016 |
| WO | 2016154568 | 9/2016 |
| WO | 2016176471 | 11/2016 |
| WO | 2016176600 | 11/2016 |
| WO | 2016176606 | 11/2016 |
| WO | 2016178797 | 11/2016 |
| WO | 2017019299 | 2/2017 |
| WO | 2017062566 | 4/2017 |
| WO | 2017079484 | 5/2017 |
| WO | 2017200570 | 11/2017 |
| WO | 2017200571 | 11/2017 |
| WO | 20170200949 | 11/2017 |
| WO | 2018106306 | 6/2018 |

OTHER PUBLICATIONS

"Foreign Office Action", JP Application No. 2021-85256, dated Apr. 20, 2022, 6 pages.
"Notice of Allowance", U.S. Appl. No. 16/875,427, dated Feb. 22, 2022, 13 pages.
"Advisory Action", U.S. Appl. No. 16/689,519, dated Jun. 30, 2021, 2 pages.
"Advisory Action", U.S. Appl. No. 14/504,139, dated Aug. 28, 2017, 3 pages.
"Advisory Action", U.S. Appl. No. 15/704,825, dated Feb. 10, 2021, 4 pages.
"Apple Watch Used Four Sensors to Detect your Pulse", retrieved from http://www.theverge.com/2014/9/9/6126991 / apple-watch-four-back-sensors-detect-activity on Sep. 23, 2017 as cited in PCT search report for PCT Application No. PCT/US2016/026756 dated Nov. 10, 2017; The Verge, paragraph 1, Sep. 9, 2014, 4 pages.
"Cardiio", Retrieved From: <http://www.cardiio.com/> Apr. 15, 2015 App Information Retrieved From: <https://itunes.apple.com/us/app/cardiio-touchless-camera-pulse/id542891434?Is=1&mt=8> Apr. 15, 2015, Feb. 24, 2015, 6 pages.
"Clever Toilet Checks on Your Health", CNN.Com; Technology, Jun. 28, 2005, 2 pages.
"Combined Search and Examination Report", GB Application No. 1620892.8, dated Apr. 6, 2017, 5 pages.
"Combined Search and Examination Report", GB Application No. 1620891.0, dated May 31, 2017, 9 pages.
"EP Appeal Decision", EP Application No. 10194359.5, May 28, 2019, 20 pages.
"European Search Report", European Application No. 16789735.4, dated Nov. 14, 2018, 4 pages.
"Extended European Search Report", European Application No. 19164113.3, dated Jun. 13, 2019, 11 pages.
"Extended European Search Report", EP Application No. 15170577.9, dated Nov. 5, 2015, 12 pages.
"Extended European Search Report", EP Application No. 21156948.8, dated Aug. 27, 2021, 15 pages.
"Extended European Search Report", European Application No. 19158625.4, dated May 8, 2019, 16 pages.
"Extended European Search Report", EP Application No. 20174555.1, dated Oct. 13, 2020, 9 pages.
"Final Office Action", U.S. Appl. No. 15/462,957, dated Nov. 8, 2019, 10 Pages.
"Final Office Action", U.S. Appl. No. 14/504,061, dated Mar. 9, 2016, 10 pages.
"Final Office Action", U.S. Appl. No. 14/681,625, dated Dec. 7, 2016, 10 pages.
"Final Office Action", U.S. Appl. No. 15/287,253, dated Apr. 2, 2019, 10 pages.
"Final Office Action", U.S. Appl. No. 15/398,147, dated Jun. 30, 2017, 11 pages.
"Final Office Action", U.S. Appl. No. 15/287,155, dated Apr. 10, 2019, 11 pages.
"Final Office Action", U.S. Appl. No. 14/959,799, dated Jul. 19, 2017, 12 pages.
"Final Office Action", U.S. Appl. No. 14/731,195, dated Oct. 11, 2018, 12 pages.
"Final Office Action", U.S. Appl. No. 16/689,519, dated Apr. 29, 2021, 13 pages.
"Final Office Action", U.S. Appl. No. 15/595,649, dated May 23, 2018, 13 pages.
"Final Office Action", U.S. Appl. No. 14/715,454, dated Sep. 7, 2017, 14 pages.
"Final Office Action", U.S. Appl. No. 16/503,234, dated Dec. 30, 2020, 14 pages.
"Final Office Action", U.S. Appl. No. 14/504,139, dated May 1, 2018, 14 pages.
"Final Office Action", U.S. Appl. No. 15/286,512, dated Dec. 26, 2018, 15 pages.
"Final Office Action", U.S. Appl. No. 15/142,619, dated Feb. 8, 2018, 15 pages.
"Final Office Action", U.S. Appl. No. 16/238,464, dated Jul. 25, 2019, 15 pages.
"Final Office Action", U.S. Appl. No. 15/287,359, dated Feb. 19, 2020, 16 Pages.
"Final Office Action", U.S. Appl. No. 14/504,121, dated Aug. 8, 2017, 16 pages.
"Final Office Action", U.S. Appl. No. 14/959,730, dated Nov. 22, 2017, 16 pages.

(56) References Cited

OTHER PUBLICATIONS

"Final Office Action", U.S. Appl. No. 15/142,689, dated Jun. 1, 2018, 16 pages.
"Final Office Action", U.S. Appl. No. 14/959,799, dated Jan. 4, 2018, 17 pages.
"Final Office Action", U.S. Appl. No. 14/720,632, dated Jan. 9, 2018, 18 pages.
"Final Office Action", U.S. Appl. No. 15/704,825, dated Nov. 23, 2020, 18 pages.
"Final Office Action", U.S. Appl. No. 14/518,863, dated May 5, 2017, 18 pages.
"Final Office Action", U.S. Appl. No. 14/959,901, dated May 30, 2019, 18 pages.
"Final Office Action", U.S. Appl. No. 14/959,901, dated Aug. 25, 2017, 19 pages.
"Final Office Action", U.S. Appl. No. 15/093,533, dated May 21, 2018, 19 pages.
"Final Office Action", U.S. Appl. No. 14/715,454, dated Apr. 27, 2018, 19 pages.
"Final Office Action", U.S. Appl. No. 15/286,537, dated Apr. 19, 2019, 21 pages.
"Final Office Action", U.S. Appl. No. 14/518,863, dated Apr. 5, 2018, 21 pages.
"Final Office Action", U.S. Appl. No. 15/596,702, dated Jun. 13, 2019, 21 pages.
"Final Office Action", U.S. Appl. No. 14/959,901, dated Jun. 15, 2018, 21 pages.
"Final Office Action", U.S. Appl. No. 15/287,308, dated Feb. 8, 2019, 23 pages.
"Final Office Action", U.S. Appl. No. 14/599,954, dated Aug. 10, 2016, 23 pages.
"Final Office Action", U.S. Appl. No. 14/504,038, dated Sep. 27, 2016, 23 pages.
"Final Office Action", U.S. Appl. No. 14/504,121, dated Jul. 9, 2018, 23 pages.
"Final Office Action", U.S. Appl. No. 15/286,152, dated Jun. 26, 2018, 25 pages.
"Final Office Action", U.S. Appl. No. 15/704,615, dated Dec. 11, 2020, 26 pages.
"Final Office Action", U.S. Appl. No. 15/142,471, dated Jun. 20, 2019, 26 pages.
"Final Office Action", U.S. Appl. No. 15/596,702, dated Apr. 14, 2020, 27 Pages.
"Final Office Action", U.S. Appl. No. 15/403,066, dated Oct. 6, 2017, 31 pages.
"Final Office Action", U.S. Appl. No. 15/267,181, dated Jun. 7, 2018, 31 pages.
"Final Office Action", U.S. Appl. No. 14/312,486, dated Jun. 3, 2016, 32 pages.
"Final Office Action", U.S. Appl. No. 15/166,198, dated Sep. 27, 2018, 33 pages.
"Final Office Action", U.S. Appl. No. 15/287,394, dated Sep. 30, 2019, 38 Pages.
"Final Office Action", U.S. Appl. No. 14/699,181, dated May 4, 2018, 41 pages.
"Final Office Action", U.S. Appl. No. 14/715,793, dated Sep. 12, 2017, 7 pages.
"Final Office Action", U.S. Appl. No. 14/809,901, dated Dec. 13, 2018, 7 pages.
"Final Office Action", Korean Application No. 10-2016-7036023, dated Feb. 19, 2018, 8 pages.
"Final Office Action", U.S. Appl. No. 14/874,955, dated Jun. 30, 2017, 9 pages.
"Final Office Action", U.S. Appl. No. 14/874,955, dated Jun. 11, 2018, 9 pages.
"First Action Interview OA", U.S. Appl. No. 14/715,793, dated Jun. 21, 2017, 3 pages.
"First Action Interview Office Action", U.S. Appl. No. 15/142,471, dated Feb. 5, 2019, 29 pages.
"First Action Interview Office Action", U.S. Appl. No. 16/080,293, dated Jul. 23, 2020, 3 Pages.
"First Action Interview Office Action", U.S. Appl. No. 14/959,901, dated Apr. 14, 2017, 3 pages.
"First Action Interview Office Action", U.S. Appl. No. 14/731,195, dated Jun. 21, 2018, 4 pages.
"First Action Interview Office Action", U.S. Appl. No. 15/286,152, dated Mar. 1, 2018, 5 pages.
"First Action Interview Office Action", U.S. Appl. No. 15/917,238, dated Jun. 6, 2019, 6 pages.
"First Action Interview Office Action", U.S. Appl. No. 15/166,198, dated Apr. 25, 2018, 8 pages.
"First Action Interview Pilot Program Pre-Interview Communication", U.S. Appl. No. 14/731,195, dated Aug. 1, 2017, 3 pages.
"First Exam Report", EP Application No. 15754352.1, dated Mar. 5, 2018, 7 pages.
"First Examination Report", GB Application No. 1621332.4, dated May 16, 2017, 7 pages.
"Foreign Notice of Allowance", KR Application No. 10-2021-7009474, dated Sep. 2, 2021, 2 pages.
"Foreign Notice of Allowance", KR Application No. 10-2021-7011901, dated Oct. 12, 2021, 3 pages.
"Foreign Office Action", Chinese Application No. 201580034536.8, dated Oct. 9, 2018.
"Foreign Office Action", CN Application No. 201680006327.7, dated Nov. 13, 2020.
"Foreign Office Action", Korean Application No. 1020187029464, dated Oct. 30, 2018, 1 page.
"Foreign Office Action", KR Application No. 10-2016-7036023, dated Aug. 11, 2017, 10 pages.
"Foreign Office Action", CN Application No. 201680020123.9, dated Nov. 29, 2019, 10 pages.
"Foreign Office Action", Chinese Application No. 201580034908.7, dated Feb. 19, 2019, 10 pages.
"Foreign Office Action", Chinese Application No. 201611159602.7, dated Jul. 23, 2020, 10 pages.
"Foreign Office Action", Chinese Application No. 201611191179.9, dated Aug. 28, 2019, 10 pages.
"Foreign Office Action", KR Application No. 10-2021-7007454, dated Apr. 29, 2021, 11 pages.
"Foreign Office Action", CN Application No. 201710922856.8, dated Jun. 19, 2020, 11 pages.
"Foreign Office Action", Japanese Application No. 2018-501256, dated Jul. 24, 2018, 11 pages.
"Foreign Office Action", JP Application No. 2019-078554, dated Jul. 21, 2020, 12 pages.
"Foreign Office Action", KR Application No. 10-2016-7036396, dated Jan. 3, 2018, 12 pages.
"Foreign Office Action", Chinese Application No. 201580036075.8, dated Jul. 4, 2018, 14 page.
"Foreign Office Action", European Application No. 16725269.1, dated Nov. 26, 2018, 14 pages.
"Foreign Office Action", Chinese Application No. 201680021212.5, dated Sep. 3, 2019, 14 pages.
"Foreign Office Action", JP Application No. 2016-563979, dated Sep. 21, 2017, 15 pages.
"Foreign Office Action", Japanese Application No. 1020187027694, dated Nov. 23, 2018, 15 pages.
"Foreign Office Action", CN Application No. 201611159870.9, dated Dec. 17, 2019, 15 pages.
"Foreign Office Action", European Application No. 16725269.1, dated Mar. 24, 2020, 15 pages.
"Foreign Office Action", JP Application No. 2020027181, dated Nov. 17, 2020, 16 pages.
"Foreign Office Action", CN Application No. 201580034908.7, dated Jul. 3, 2018, 17 pages.
"Foreign Office Action", Chinese Application No. 201510300495.4, dated Jun. 21, 2018, 18 pages.
"Foreign Office Action", Chinese Application No. 201680020567.2, dated Sep. 26, 2019, 19 pages.
"Foreign Office Action", KR Application No. 10-2019-7004803, dated Oct. 14, 2019, 2 pages.

(56) References Cited

OTHER PUBLICATIONS

"Foreign Office Action", KR Application No. 10-2019-7004803, dated Dec. 6, 2019, 2 pages.
"Foreign Office Action", Chinese Application No. 201611159602.7, dated Oct. 11, 2019, 20 pages.
"Foreign Office Action", Chinese Application No. 201580035246.5, dated Jan. 31, 2019, 22 pages.
"Foreign Office Action", Chinese Application No. 201680021213.X, dated Oct. 28, 2019, 26 pages.
"Foreign Office Action", European Application No. 16725269.1, dated Feb. 9, 2021, 26 pages.
"Foreign Office Action", CN Application No. 201680038897.4, dated Jun. 29, 2020, 28 pages.
"Foreign Office Action", Japanese Application No. 2018156138, dated May 22, 2019, 3 pages.
"Foreign Office Action", JP Application No. 2018156138, dated Sep. 30, 2019, 3 pages.
"Foreign Office Action", Korean Application No. 10-2016-7036015, dated Oct. 15, 2018, 3 pages.
"Foreign Office Action", GB Application No. 1621332.4, dated Nov. 6, 2019, 3 pages.
"Foreign Office Action", Japanese Application No. 2018501256, dated Feb. 26, 2019, 3 pages.
"Foreign Office Action", Japanese Application No. 2018156138, dated Apr. 22, 2020, 3 pages.
"Foreign Office Action", Japanese Application No. 2016-567839, dated Apr. 3. 2018, 3 pages.
"Foreign Office Action", Japanese Application No. 2018-021296, dated Apr. 9, 2019, 3 pages.
"Foreign Office Action", European Application No. 16784352.3, dated May 16, 2018, 3 pages.
"Foreign Office Action", Japanese Application No. 2016-563979, dated May 21, 2018, 3 pages.
"Foreign Office Action", Chinese Application No. 201721290290.3, dated Jun. 6, 2018, 3 pages.
"Foreign Office Action", CN Application No. 201680038897.4, dated Feb. 1, 2021, 30 pages.
"Foreign Office Action", European Application No. 15170577.9, dated Dec. 21, 2018, 31 pages.
"Foreign Office Action", GB Application No. 1621191.4, dated Jun. 23, 2021, 4 pages.
"Foreign Office Action", Japanese Application No. 2016-575564, dated Jan. 10, 2019, 4 pages.
"Foreign Office Action", GB Application No. 1621191.4, dated Dec. 31, 2020, 4 pages.
"Foreign Office Action", CN Application No. 201721290290.3, dated Mar 9, 2018, 4 pages.
"Foreign Office Action", Korean Application No. 10-2016-7036023, dated Apr. 12, 2018, 4 pages.
"Foreign Office Action", Japanese Application No. 2016-575564, dated Jul. 10, 2018, 4 pages.
"Foreign Office Action", KR Application No. 10-2021-7009474, dated May 10, 2021, 5 pages.
"Foreign Office Action", KR Application No. 1020217011901, dated Jun. 4, 2021, 5 pages.
"Foreign Office Action", GB Application No. 1621192.2, dated Jun. 17, 2020, 5 pages.
"Foreign Office Action", KR Application No. 10-2016-7035397, dated Sep. 20, 2017, 5 pages.
"Foreign Office Action", Japanese Application No. 2018169008, dated Jan. 14, 2020, 5 pages.
"Foreign Office Action", JP Application No. 2018501256, dated Oct. 23, 2019, 5 pages.
"Foreign Office Action", Korean Application No. 10-2017-7027877, dated Nov. 23, 2018, 5 pages.
"Foreign Office Action", Japanese Application No. 2017-541972, dated Nov. 27, 2018, 5 pages.
"Foreign Office Action", European Application No. 15754352.1, dated Nov. 7, 2018, 5 pages.
"Foreign Office Action", EP Application No. 16784352.3, dated Dec. 9, 2020, 5 pages.
"Foreign Office Action", European Application No. 16789735.4, dated Dec. 12, 2018, 5 pages.
"Foreign Office Action", Japanese Application No. 2016-575564, dated Dec. 5, 2017, 5 pages.
"Foreign Office Action", UK Application No. 1620891.0, dated Dec. 6, 2018, 5 pages.
"Foreign Office Action", Chinese Application No. 201580036075.8, dated Feb. 19, 2019, 5 pages.
"Foreign Office Action", Japanese Application No. 2016-563979, dated Feb. 7, 2018, 5 pages.
"Foreign Office Action", KR Application No. 1020187004283, dated Sep. 11, 2020, 5 pages.
"Foreign Office Action", British Application No. 1912334.8, dated Sep. 23, 2019, 5 pages.
"Foreign Office Action", KR Application No. 10-2019-7004803, dated Jan. 21, 2021, 6 pages.
"Foreign Office Action", EP Application No. 16724775.8, dated May 27, 2021, 6 pages.
"Foreign Office Action", Korean Application No. 1020197019768, dated Sep. 30, 2019, 6 pages.
"Foreign Office Action", JP Application No. 2016-567813, dated Jan. 16, 2018, 6 pages.
"Foreign Office Action", Korean Application No. 10-2017-7027871, dated Nov. 23, 2018, 6 pages.
"Foreign Office Action", Chinese Application No 201510300495.4, dated Apr. 10, 2019, 6 pages.
"Foreign Office Action", KR Application No. 10-2019-7004803, dated Apr. 26, 2019, 6 pages.
"Foreign Office Action", Korean Application No. 1020187012629, dated May 24, 2018, 6 pages.
"Foreign Office Action", EP Application No. 15170577.9, dated May 30, 2017, 7 pages.
"Foreign Office Action", Korean Application No. 1020197023675, dated Jul. 13, 2020, 7 pages.
"Foreign Office Action", KR Application No. 2019-7020454, dated Aug. 26, 2020, 7 pages.
"Foreign Office Action", European Application No. 16716351.8, dated Mar. 15, 2019, 7 pages.
"Foreign Office Action", Chinese Application No. 201680021213.X, dated Aug. 27, 2020, 7 pages.
"Foreign Office Action", IN Application No. 201747044162, dated Sep. 3, 2020, 7 pages.
"Foreign Office Action", JP Application No. 2016-567813, dated Sep. 22, 2017, 8 pages.
"Foreign Office Action", Korean Application No. 1020187004283, dated Jan. 3, 2020, 8 pages.
"Foreign Office Action", Japanese Application No. 2018021296, dated Dec. 25, 2018, 8 pages.
"Foreign Office Action", EP Application No. 15754323.2, dated Mar. 9, 2018, 8 pages.
"Foreign Office Action", European Application No. 16724775.8, dated Nov. 23, 2018, 9 pages.
"Foreign Office Action", DE Application No. 102016014611.7, dated Sep. 28, 2020, 9 pages.
"Foreign Office Action", KR Application No. 10-2016-7032967, English Translation, dated Sep. 14, 2017, 4 pages.
"Foreign Office Acton", EP Application No. 21156948.8, dated May 21, 2021, 15 pages.
"Frogpad Introduces Wearable Fabric Keyboard with Bluetooth Technology", Retrieved From: <http://www.geekzone.co.nz/content.asp?contentid=3898> Mar. 16, 2015, 2 pages.
"Galaxy S4 Air Gesture", Galaxy S4 Guides, retrieved from: https://allaboutgalaxys4.com/galaxy-s4-features-explained/air-gesture/ on Sep. 3, 2019, 4 pages.
"International Preliminary Report on Patentability", PCT Application No. PCT/US2017/051663, dated Jun. 20, 2019, 10 pages.
"International Preliminary Report on Patentability", PCT Application No. PCT/US2016/063874, dated Nov. 29, 2018, 12 pages.
"International Preliminary Report on Patentability", Application No. PCT/US2015/030388, dated Dec. 15, 2016, 12 pages.

(56) References Cited

OTHER PUBLICATIONS

"International Preliminary Report on Patentability", Application No. PCT/US2015/043963, dated Feb. 16, 2017, 12 pages.
"International Preliminary Report on Patentability", Application No. PCT/US2015/050903, dated Apr. 13, 2017, 12 pages.
"International Preliminary Report on Patentability", Application No. PCT/US2015/043949, dated Feb. 16, 2017, 13 pages.
"International Preliminary Report on Patentability", PCT Application No. PCT/US2017/032733, dated Nov. 29, 2018, 7 pages.
"International Preliminary Report on Patentability", PCT Application No. PCT/US2016/026756, dated Oct. 19, 2017, 8 pages.
"International Preliminary Report on Patentability", Application No. PCT/US2015/044774, dated Mar. 2, 2017, 8 pages.
"International Search Report and Written Opinion", Application No. PCT/US2016/060399, dated Jan. 30, 2017, 11 pages.
"International Search Report and Written Opinion", Application No. PCT/US2016/065295, dated Mar. 14, 2017, 12 pages.
"International Search Report and Written Opinion", Application No. PCT/US2015/044774, dated Nov. 3, 2015, 12 pages.
"International Search Report and Written Opinion", Application No. PCT/US2016/042013, dated Oct. 26, 2016, 12 pages.
"International Search Report and Written Opinion", Application No. PCT/US2016/062082, dated Feb. 23, 2017, 12 pages.
"International Search Report and Written Opinion", PCT/US2017/047691, dated Nov. 16, 2017, 13 pages.
"International Search Report and Written Opinion", Application No. PCT/US2016/024267, dated Jun. 20, 2016, 13 pages.
"International Search Report and Written Opinion", Application No. PCT/US2016/024273, dated Jun. 20, 2016, 13 pages.
"International Search Report and Written Opinion", Application No. PCT/US2016/032307, dated Aug. 25, 2016, 13 pages.
"International Search Report and Written Opinion", Application No. PCT/US2016/034366, dated Nov. 17, 2016, 13 pages.
"International Search Report and Written Opinion", Application No. PCT/US2016/029820, dated Jul. 15, 2016, 14 pages.
"International Search Report and Written Opinion", Application No. PCT/US2016/055671, dated Dec. 1, 2016, 14 pages.
"International Search Report and Written Opinion", Application No. PCT/US2016/030177, dated Aug. 2, 2016, 15 pages.
"International Search Report and Written Opinion", PCT Application No. PCT/US2017/051663, dated Nov. 29, 2017, 16 pages.
"International Search Report and Written Opinion", Application No. PCT/US2015/043963, dated Nov. 24, 2015, 16 pages.
"International Search Report and Written Opinion", Application No. PCT/US2016/024289, dated Aug. 25, 2016, 17 pages.
"International Search Report and Written Opinion", Application No. PCT/US2015/043949, dated Dec. 1, 2015, 18 pages.
"International Search Report and Written Opinion", Application No. PCT/US2015/050903, dated Feb. 19, 2016, 18 pages.
"International Search Report and Written Opinion", Application No. PCT/US2016/030115, dated Aug. 8, 2016, 18 pages.
"International Search Report and Written Opinion", Application No. PCT/US2016/063874, dated May 11, 2017, 19 pages.
"International Search Report and Written Opinion", Application No. PCT/US2016/033342, dated Oct. 27, 2016, 20 pages.
"Life:X Lifestyle eXplorer", Retrieved from <https://web.archive.org/web/20150318093841/http://research.microsoft.com/en-us/projects/lifex >, Feb. 3, 2017, 2 pages.
"Non-Final Office Action", U.S. Appl. No. 15/596,702, dated Jan. 4, 2019, 10 pages.
"Non-Final Office Action", U.S. Appl. No. 16/153,395, dated Oct. 22, 2019, 10 Pages.
"Non-Final Office Action", U.S. Appl. No. 15/286,837, dated Oct. 26, 2018, 10 pages.
"Non-Final Office Action", U.S. Appl. No. 14/504,139, dated Jan. 27, 2017, 10 pages.
"Non-Final Office Action", U.S. Appl. No. 14/959,799, dated Jan. 27, 2017, 10 pages.
"Non-Final Office Action", U.S. Appl. No. 15/398,147, dated Mar. 9, 2017, 10 pages.
"Non-Final Office Action", U.S. Appl. No. 16/843,813, dated Mar. 18, 2021, 12 pages.
"Non-Final Office Action", U.S. Appl. No. 14/504,139, dated Oct. 18, 2017, 12 pages.
"Non-Final Office Action", U.S. Appl. No. 15/287,155, dated Dec. 10, 2018, 12 pages.
"Non-Final Office Action", U.S. Appl. No. 14/666,155, dated Feb. 3, 2017, 12 pages.
"Non-Final Office Action", U.S. Appl. No. 15/424,263, dated May 23, 2019, 12 pages.
"Non-Final Office Action", U.S. Appl. No. 16/669,842, dated Sep. 3, 2020, 12 pages.
"Non-Final Office Action", U.S. Appl. No. 16/252,477, dated Jan. 10, 2020, 13 Pages.
"Non-Final Office Action", U.S. Appl. No. 14/504,121, dated Jan. 9, 2017, 13 pages.
"Non-Final Office Action", U.S. Appl. No. 14/809,901, dated May 24, 2018, 13 pages.
"Non-Final Office Action", U.S. Appl. No. 14/959,730, dated Jun. 23, 2017, 14 pages.
"Non-Final Office Action", U.S. Appl. No. 15/462,957, dated May 24, 2019, 14 pages.
"Non-Final Office Action", U.S. Appl. No. 14/862,409, dated Jun. 22, 2017, 15 pages.
"Non-Final Office Action", U.S. Appl. No. 14/930,220, dated Sep. 14, 2016, 15 pages.
"Non-Final Office Action", U.S. Appl. No. 16/238,464, dated Mar. 7, 2019, 15 pages.
"Non-Final Office Action", U.S. Appl. No. 15/286,512, dated Jul. 19, 2018, 15 pages.
"Non-Final Office Action", U.S. Appl. No. 15/142,829, dated Aug. 16, 2018, 15 pages.
"Non-Final Office Action", U.S. Appl. No. 14/720,632, dated Jun. 14, 2017, 16 pages.
"Non-Final Office Action", U.S. Appl. No. 15/142,619, dated Aug. 25, 2017, 16 pages.
"Non-Final Office Action", U.S. Appl. No. 14/959,799, dated Sep. 8, 2017, 16 pages.
"Non-Final Office Action", U.S. Appl. No. 14/715,454, dated Jan. 11, 2018, 16 pages.
"Non-Final Office Action", U.S. Appl. No. 15/595,649, dated Oct. 31, 2017, 16 pages.
"Non-Final Office Action", U.S. Appl. No. 14/504,139, dated Oct. 5, 2018, 16 pages.
"Non-Final Office Action", U.S. Appl. No. 15/976,518, dated Nov. 25, 2020, 16 pages.
"Non-Final Office Action", U.S. Appl. No. 14/518,863, dated Oct. 14, 2016, 16 pages.
"Non-Final Office Action", U.S. Appl. No. 14/599,954, dated Jan. 26, 2017, 16 pages.
"Non-Final Office Action", U.S. Appl. No. 16/822,601, dated Mar. 15, 2021, 17 pages.
"Non-Final Office Action", U.S. Appl. No. 16/503,234, dated Mar. 18, 2021, 17 pages.
"Non-Final Office Action", U.S. Appl. No. 14/862,409, dated Dec. 14, 2017, 17 pages.
"Non-Final Office Action", U.S. Appl. No. 14/599,954, dated Feb. 2, 2016, 17 pages.
"Non-Final Office Action", U.S. Appl. No. 15/287,253, dated Apr. 5, 2018, 17 pages.
"Non-Final Office Action", U.S. Appl. No. 16/503,234, dated Aug. 5, 2020, 18 Pages.
"Non-Final Office Action", U.S. Appl. No. 15/093,533, dated Aug. 24, 2017, 18 pages.
"Non-Final Office Action", U.S. Appl. No. 15/142,689, dated Oct. 4, 2017, 18 pages.
"Non-Final Office Action", U.S. Appl. No. 15/287,308, dated Oct. 15, 2018, 18 pages.
"Non-Final Office Action", U.S. Appl. No. 15/286,537, dated Nov. 19, 2018, 18 pages.
"Non-Final Office Action", U.S. Appl. No. 15/287,359, dated Jun. 26, 2020, 19 Pages.

(56) References Cited

OTHER PUBLICATIONS

"Non-Final Office Action", U.S. Appl. No. 14/504,121, dated Jan. 2, 2018, 19 pages.
"Non-Final Office Action", U.S. Appl. No. 15/287,359, dated Oct. 28, 2020, 19 pages.
"Non-Final Office Action", U.S. Appl. No. 15/287,253, dated Sep. 7, 2018, 20 pages.
"Non-Final Office Action", U.S. Appl. No. 14/518,863, dated Sep. 29, 2017, 20 pages.
"Non-Final Office Action", U.S. Appl. No. 14/720,632, dated May 18, 2018, 20 pages.
"Non-Final Office Action", U.S. Appl. No. 14/959,901, dated Jan. 8, 2018, 21 pages.
"Non-Final Office Action", U.S. Appl. No. 15/596,702, dated Oct. 21, 2019, 21 Pages.
"Non-Final Office Action", U.S. Appl. No. 15/704,825, dated Jun. 1, 2020, 22 Pages.
"Non-Final Office Action", U.S. Appl. No. 15/791,044, dated Sep. 30, 2019, 22 Pages.
"Non-Final Office Action", U.S. Appl. No. 14/959,901, dated Oct. 11, 2018, 22 pages.
"Non-Final Office Action", U.S. Appl. No. 16/689,519, dated Oct. 20, 2020, 22 pages.
"Non-Final Office Action", U.S. Appl. No. 14/504,038, dated Feb. 26, 2016, 22 pages.
"Non-Final Office Action", U.S. Appl. No. 17/005,207, dated Apr. 1, 2021, 23 pages.
"Non-Final Office Action", U.S. Appl. No. 14/312,486, dated Oct. 23, 2015, 25 pages.
"Non-Final Office Action", U.S. Appl. No. 15/596,702, dated Aug. 19, 2020, 27 Pages.
"Non-Final Office Action", U.S. Appl. No. 15/286,152, dated Oct. 19, 2018, 27 pages.
"Non-Final Office Action", U.S. Appl. No. 15/286,537, dated Sep. 3, 2019, 28 Pages.
"Non-Final Office Action", U.S. Appl. No. 15/704,615, dated Jun. 1, 2020, 29 Pages.
"Non-Final Office Action", U.S. Appl. No. 15/267,181, dated Feb. 8, 2018, 29 pages.
"Non-Final Office Action", U.S. Appl. No. 15/403,066, dated May 4, 2017, 31 pages.
"Non-Final Office Action", U.S. Appl. No. 14/699,181, dated Oct. 18, 2017, 33 pages.
"Non-Final Office Action", U.S. Appl. No. 14/504,038, dated Mar. 22, 2017, 33 pages.
"Non-Final Office Action", U.S. Appl. No. 16/875,427, dated Oct. 5, 2021, 37 pages.
"Non-Final Office Action", U.S. Appl. No. 15/287,394, dated Mar. 22, 2019, 39 pages.
"Non-Final Office Action", U.S. Appl. No. 15/166,198, dated Feb. 21, 2019, 48 pages.
"Non-Final Office Action", U.S. Appl. No. 15/398,147, dated Sep. 8, 2017, 7 pages.
"Non-Final Office Action", U.S. Appl. No. 14/874,955, dated Feb. 8, 2018, 7 pages.
"Non-Final Office Action", U.S. Appl. No. 14/681,625, dated Mar. 6, 2017, 7 pages.
"Non-Final Office Action", U.S. Appl. No. 15/586,174, dated Jun. 18, 2018, 7 pages.
"Non-Final Office Action", U.S. Appl. No. 14/504,061, dated Nov. 4, 2015, 8 pages.
"Non-Final Office Action", U.S. Appl. No. 14/874,955, dated Feb. 27, 2017, 8 pages.
"Non-Final Office Action", U.S. Appl. No. 14/513,875, dated Feb. 21, 2017, 9 pages.
"Non-Final Office Action", U.S. Appl. No. 16/744,626, dated Sep. 23, 2020, 9 Pages.
"Non-Final Office Action", U.S. Appl. No. 14/582,896, dated Jun. 29, 2016, 9 pages.
"Non-Final Office Action", U.S. Appl. No. 14/681,625, dated Aug. 12, 2016, 9 pages.
"Non-Final Office Action", U.S. Appl. No. 14/666,155, dated Aug. 24, 2016, 9 pages.
"Non-Invasive Quantification of Peripheral Arterial Volume Distensibilitiy and its Non-Lineaer Relationship with Arterial Pressure", Journal of Biomechanics, Pergamon Press, vol. 42, No. 8; as cited in the search report for PCT/US2016/013968 citing the whole document, but in particular the abstract, dated May 29, 2009, 2 pages.
"Notice of Allowability", U.S. Appl. No. 16/560,085, dated Nov. 12, 2020, 2 pages.
"Notice of Allowance", U.S. Appl. No. 16/744,626, dated Jan. 1, 2021, 10 pages.
"Notice of Allowance", U.S. Appl. No. 16/238,464, dated Nov. 4, 2019, 10 Pages.
"Notice of Allowance", U.S. Appl. No. 15/424,263, dated Nov. 14, 2019, 10 Pages.
"Notice of Allowance", U.S. Appl. No. 15/287,394, dated Mar. 4, 2020, 11 Pages.
"Notice of Allowance", U.S. Appl. No. 14/599,954, dated May 24, 2017, 11 pages.
"Notice of Allowance", U.S. Appl. No. 16/153,395, dated Feb. 20, 2020, 13 Pages.
"Notice of Allowance", U.S. Appl. No. 15/917,238, dated Aug. 21, 2019, 13 pages.
"Notice of Allowance", U.S. Appl. No. 15/287,253, dated Aug. 26, 2019, 13 Pages.
"Notice of Allowance", U.S. Appl. No. 15/286,512, dated Apr. 9, 2019, 14 pages.
"Notice of Allowance", U.S. Appl. No. 14/312,486, dated Oct. 7, 2016, 15 pages.
"Notice of Allowance", U.S. Appl. No. 16/401,611, dated Jun. 10, 2020, 17 Pages.
"Notice of Allowance", U.S. Appl. No. 15/287,308, dated Jul. 17, 2019, 17 Pages.
"Notice of Allowance", U.S. Appl. No. 14/504,038, dated Aug. 7, 2017, 17 pages.
"Notice of Allowance", U.S. Appl. No. 15/403,066, dated Jan. 8, 2018, 18 pages.
"Notice of Allowance", U.S. Appl. No. 15/287,200, dated Nov. 6, 2018, 19 pages.
"Notice of Allowance", U.S. Appl. No. 15/286,152, dated Mar. 5, 2019, 23 pages.
"Notice of Allowance", U.S. Appl. No. 16/356,748, dated Feb. 11, 2020, 5 Pages.
"Notice of Allowance", U.S. Appl. No. 14/715,793, dated Jul. 6, 2018, 5 pages.
"Notice of Allowance", U.S. Appl. No. 17/005,207, dated Jul. 14, 2021, 5 pages.
"Notice of Allowance", U.S. Appl. No. 15/093,533, dated Jul. 16, 2020, 5 Pages.
"Notice of Allowance", U.S. Appl. No. 15/286,495, dated Jan. 17, 2019, 5 pages.
"Notice of Allowance", U.S. Appl. No. 15/595,649, dated Jan. 3, 2019, 5 pages.
"Notice of Allowance", U.S. Appl. No. 14/715,793, dated Dec. 18, 2017, 5 pages.
"Notice of Allowance", U.S. Appl. No. 14/666,155, dated Feb. 20, 2018, 5 pages.
"Notice of Allowance", U.S. Appl. No. 14/582,896, dated Nov. 7, 2016, 5 pages.
"Notice of Allowance", U.S. Appl. No. 15/703,511, dated Apr. 16, 2019, 5 pages.
"Notice of Allowance", U.S. Appl. No. 15/586,174, dated Sep. 24, 2018, 5 pages.
"Notice of Allowance", U.S. Appl. No. 15/287,359, dated Apr. 14, 2021, 7 pages.
"Notice of Allowance", U.S. Appl. No. 14/513,875, dated Jun. 28, 2017, 7 pages.
"Notice of Allowance", U.S. Appl. No. 14/666,155, dated Jul. 10, 2017, 7 pages.

(56) References Cited

OTHER PUBLICATIONS

"Notice of Allowance", U.S. Appl. No. 15/142,471, dated Aug. 6, 2020, 7 Pages.
"Notice of Allowance", U.S. Appl. No. 16/389,402, dated Aug. 21, 2019, 7 Pages.
"Notice of Allowance", U.S. Appl. No. 16/380,245, dated Sep. 15, 2020, 7 Pages.
"Notice of Allowance", U.S. Appl. No. 14/874,955, dated Oct. 20, 2017, 7 pages.
"Notice of Allowance", U.S. Appl. No. 14/504,061, dated Sep. 12, 2016, 7 pages.
"Notice of Allowance", U.S. Appl. No. 14/494,863, dated May 30, 2017, 7 pages.
"Notice of Allowance", U.S. Appl. No. 14/681,625, dated Jun. 7, 2017, 7 pages.
"Notice of Allowance", U.S. Appl. No. 15/286,837, dated Mar. 6, 2019, 7 pages.
"Notice of Allowance", U.S. Appl. No. 14/731,195, dated Apr. 24, 2019, 7 pages.
"Notice of Allowance", U.S. Appl. No. 14/862,409, dated Jun. 6, 2018, 7 pages.
"Notice of Allowance", U.S. Appl. No. 15/287,155, dated Jul. 25, 2019, 7 pages.
"Notice of Allowance", U.S. Appl. No. 15/462,957, dated Jan. 23, 2020, 8 Pages.
"Notice of Allowance", U.S. Appl. No. 15/791,044, dated Feb. 12, 2020, 8 Pages.
"Notice of Allowance", U.S. Appl. No. 14/504,121, dated Jun. 1, 2021, 8 pages.
"Notice of Allowance", U.S. Appl. No. 16/503,234, dated Jun. 11, 2021, 8 pages.
"Notice of Allowance", U.S. Appl. No. 16/252,477, dated Jun. 24, 2020, 8 Pages.
"Notice of Allowance", U.S. Appl. No. 16/843,813, dated Jun. 30, 2021, 8 pages.
"Notice of Allowance", U.S. Appl. No. 15/362,359, dated Aug. 3, 2018, 8 pages.
"Notice of Allowance", U.S. Appl. No. 17/148,374, dated Oct. 14, 2021, 8 pages.
"Notice of Allowance", U.S. Appl. No. 16/560,085, dated Oct. 19, 2020, 8 pages.
"Notice of Allowance", U.S. Appl. No. 14/681,625, dated Oct. 23, 2017, 8 pages.
"Notice of Allowance", U.S. Appl. No. 14/874,955, dated Oct. 4, 2018, 8 pages.
"Notice of Allowance", U.S. Appl. No. 15/398,147, dated Nov. 15, 2017, 8 pages.
"Notice of Allowance", U.S. Appl. No. 16/669,842, dated Dec. 18, 2020, 8 pages.
"Notice of Allowance", U.S. Appl. No. 14/959,730, dated Feb. 22, 2018, 8 pages.
"Notice of Allowance", U.S. Appl. No. 15/142,829, dated Feb. 6, 2019, 8 pages.
"Notice of Allowance", U.S. Appl. No. 14/930,220, dated Feb. 2, 2017, 8 pages.
"Notice of Allowance", U.S. Appl. No. 15/352,194, dated Jun. 26, 2019, 8 pages.
"Notice of Allowance", U.S. Appl. No. 15/595,649, dated Sep. 14, 2018, 8 pages.
"Notice of Allowance", U.S. Appl. No. 16/563,124, dated Jul. 8, 2021, 9 pages.
"Notice of Allowance", U.S. Appl. No. 15/343,067, dated Jul. 27, 2017, 9 pages.
"Notice of Allowance", U.S. Appl. No. 16/822,601, dated Aug. 5, 2021, 9 pages.
"Notice of Allowance", U.S. Appl. No. 16/689,519, dated Sep. 30, 2021, 9 pages.
"Notice of Allowance", U.S. Appl. No. 16/356,748, dated Oct. 17, 2019, 9 Pages.
"Notice of Allowance", U.S. Appl. No. 15/142,689, dated Oct. 30, 2018, 9 pages.
"Notice of Allowance", U.S. Appl. No. 14/504,137, dated Feb. 6, 2019, 9 pages.
"Notice of Allowance", U.S. Appl. No. 14/599,954, dated Mar. 15, 2018, 9 pages.
"Notice of Allowance", U.S. Appl. No. 15/142,619, dated Aug. 13, 2018, 9 pages.
"Patent Board Decision", U.S. Appl. No. 14/504,121, May 20, 20201, 9 pages.
"Philips Vital Signs Camera", Retrieved From: <http://www.vitalsignscamera.com/> Apr. 15, 2015, Jul. 17, 2013, 2 pages.
"Pre-Interview Communication", U.S. Appl. No. 15/287,359, dated Jul. 24, 2018, 2 pages.
"Pre-Interview Communication", U.S. Appl. No. 16/380,245, dated Jun. 15, 2020, 3 Pages.
"Pre-Interview Communication", U.S. Appl. No. 16/080,293, dated Jun. 25, 2020, 3 Pages.
"Pre-Interview Communication", U.S. Appl. No. 14/513,875, dated Oct. 21, 2016, 3 pages.
"Pre-Interview Communication", U.S. Appl. No. 15/142,471, dated Dec. 12, 2018, 3 pages.
"Pre-Interview Communication", U.S. Appl. No. 14/715,793, dated Mar. 20, 2017, 3 pages.
"Pre-Interview Communication", U.S. Appl. No. 14/715,454, dated Apr. 14, 2017, 3 pages.
"Pre-Interview Communication", U.S. Appl. No. 15/343,067, dated Apr. 19, 2017, 3 pages.
"Pre-Interview Communication", U.S. Appl. No. 16/401,611, dated Apr. 13, 2020, 4 Pages.
"Pre-Interview Communication", U.S. Appl. No. 15/286,495, dated Sep. 10, 2018, 4 pages.
"Pre-Interview Communication", U.S. Appl. No. 14/959,901, dated Feb. 10, 2017, 4 pages.
"Pre-Interview Communication", U.S. Appl. No. 14/959,730, dated Feb. 15, 2017, 4 pages.
"Pre-Interview Communication", U.S. Appl. No. 15/362,359, dated May 17, 2018, 4 pages.
"Pre-Interview Communication", U.S. Appl. No. 15/703,511, dated Feb. 11, 2019, 5 pages.
"Pre-Interview Communication", U.S. Appl. No. 14/494,863, dated Jan. 27, 2017, 5 pages.
"Pre-Interview Communication", U.S. Appl. No. 15/917,238, dated May 1, 2019, 6 pages.
"Pre-Interview Communication", U.S. Appl. No. 15/166,198, dated Mar. 8, 2018, 8 pages.
"Pre-Interview First Office Action", U.S. Appl. No. 15/286,152, dated Feb. 8, 2018, 4 pages.
"Pre-Interview Office Action", U.S. Appl. No. 14/862,409, dated Sep. 15, 2017, 16 pages.
"Pre-Interview Office Action", U.S. Appl. No. 14/731,195, dated Dec. 20, 2017, 4 pages.
"Preliminary Report on Patentability", PCT Application No. PCT/US2016/034366, dated Dec. 7, 2017, 10 pages.
"Preliminary Report on Patentability", PCT Application No. PCT/US2016/030177, dated Oct. 31, 2017, 11 pages.
"Preliminary Report on Patentability", PCT Application No. PCT/US2016/030115, dated Oct. 31, 2017, 15 pages.
"Preliminary Report on Patentability", PCT Application No. PCT/US2016/030185, dated Nov. 9, 2017, 16 pages.
"Preliminary Report on Patentability", Application No. PCT/US2016/065295, dated Jul. 24, 2018, 18 pages.
"Preliminary Report on Patentability", PCT Application No. PCT/US2016/042013, dated Jan. 30, 2018, 7 pages.
"Preliminary Report on Patentability", PCT Application No. PCT/US2016/062082, dated Nov. 15, 2018, 8 pages.
"Preliminary Report on Patentability", PCT Application No. PCT/US2016/055671, dated Apr. 10, 2018, 9 pages.
"Preliminary Report on Patentability", PCT Application No. PCT/US2016/032307, dated Dec. 7, 2017, 9 pages.
"Pressure-Volume Loop Analysis in Cardiology", retrieved from https://en.wikipedia.org/w/index.php?t itle=Pressure-Volume loop analysis in card iology&oldid=636928657 on Sep. 23, 2017; Obtained

(56) References Cited

OTHER PUBLICATIONS per link provided in search report from PCT/US2016/01398 dated Jul. 28, 2016, Dec. 6, 2014, 10 pages.
"Restriction Requirement", U.S. Appl. No. 15/976,518, dated Jul. 9, 2020, 5 Pages.
"Restriction Requirement", U.S. Appl. No. 15/362,359, dated Jan. 8, 2018, 5 pages.
"Restriction Requirement", U.S. Appl. No. 14/666,155, dated Jul. 22, 2016, 5 pages.
"Restriction Requirement", U.S. Appl. No. 15/462,957, dated Jan. 4, 2019, 6 pages.
"Restriction Requirement", U.S. Appl. No. 16/563,124, dated Apr. 5, 2021, 7 pages.
"Restriction Requirement", U.S. Appl. No. 15/352,194, dated Feb. 6, 2019, 8 pages.
"Restriction Requirement", U.S. Appl. No. 15/286,537, dated Aug. 27, 2018, 8 pages.
"Samsung Galaxy S4 Air Gestures", Video retrieved from https://www.youtube.com/watch?v=375Hb87yGcg, May 7, 2013, 4 pages.
"Search Report", GB Application No. 2007255.9, dated Jul. 6, 2020, 1 page.
"Textile Wire Brochure", Retrieved at: http://www.textile-wire.ch/en/home.html, Aug. 7, 2004, 17 pages.
"The Dash smart earbuds play back music, and monitor your workout", Retrieved from < http://newatlas.com/bragi-dash-tracking-earbuds/30808/>, Feb. 13, 2014, 3 pages.
"The Instant Blood Pressure app estimates blood pressure with your smartphone and our algorithm", Retrieved at: http://www.instantbloodpressure.com/—on Jun. 23, 2016, 6 pages.
"Thermofocus No Touch Forehead Thermometer", Technimed, Internet Archive. Dec. 24, 2014. hftps://web.archive.org/web/20141224070848/http://www.tecnimed.it:80/thermofocus-forehead-thermometer-H1N1-swine-flu.html, Dec. 24, 2018, 4 pages.
"Written Opinion", PCT Application No. PCT/US2016/030185, dated Nov. 3, 2016, 15 pages.
"Written Opinion", PCT Application No. PCT/US2017/032733, dated Jul. 24, 2017, 5 pages.
"Written Opinion", Application No. PCT/US2017/032733, dated Jul. 26, 2017, 5 pages.
"Written Opinion", Application No. PCT/US2016/042013, dated Feb. 2, 2017, 6 pages.
"Written Opinion", PCT Application No. PCT/US2016/060399, dated May 11, 2017, 6 pages.
"Written Opinion", Application No. PCT/US2016/026756, dated Nov. 10, 2016, 7 pages.
"Written Opinion", PCT Application No. PCT/US2016/055671, dated Apr. 13, 2017, 8 pages.
"Written Opinion", Application No. PCT/US2016/065295, dated Apr. 13, 2018, 8 pages.
"Written Opinion", PCT Application No. PCT/US2017/051663, dated Oct. 12, 2018, 8 pages.
"Written Opinion", Application No. PCT/US2016/013968, dated Jul. 28, 2016, 9 pages.
"Written Opinion", PCT Application No. PCT/US2016/030177, dated Nov. 3, 2016, 9 pages.
Amihood, Patrick M. et al., "Closed-Loop Manufacturing System Using Radar", Technical Disclosure Commons; Retrieved from http://www.tdcommons.org/dpubs_series/464, Apr. 17, 2017, 8 pages.
Antonimuthu, "Google's Project Soli brings Gesture Control to Wearables using Radar", YouTube[online], Available from https://www.youtube.com/watch?v=czJfcgvQcNA as accessed on May 9, 2017; See whole video, especially 6:05-6:35.
Arbabian, Amin et al., "A 94GHz mm-Wave to Baseband Pulsed-Radar for Imaging and Gesture Recognition", Apr. 4, 2013, pp. 1055-1071.
Azevedo, Stephen et al., "Micropower Impulse Radar", Science & Technology Review, Feb. 29, 1996, pp. 16-29, Feb. 29, 1996, 7 pages.
Badawy, Wael "System on Chip", Section 1.1 "Real-Time Applications" Springer Science & Business Media 2003, 14 pages.

Balakrishnan, Guha et al., "Detecting Pulse from Head Motions in Video", in Proceedings: CVPR '13 Proceedings of the Conference on Computer Vision and Pattern Recognition, Jun. 23, 2013, 8 pages.
Bondade, Rajdeep et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873, DOI: 10.1109/ECCE.2014.6954193, 5 pages.
Cheng, Jingyuan "Smart Textiles: From Niche to Mainstream", IEEE Pervasive Computing, Jul. 2013, pp. 81-84.
Couderc, Jean-Philippe et al., "Detection of Atrial Fibrillation using Contactless Facial Video Monitoring", in Proceedings: Heart Rhythm Society, vol. 12, Issue 1 Available at: <http://www.heartrhythmjournal.com/article/S1547-5271(14)00924-2/pdf>, 7 pages.
Dias, T et al., "Capacitive Fibre-Meshed Transducer for Touch & Proximity Sensing Applications", IEEE Sensors Journal, IEEE Service Center, New York, NY, US, vol. 5, No. 5, pp. 989-994, XP011138559, ISSN: 1530-437X, DOI: 10.1109/JSEN.2005.844327, Oct. 1, 2005, 5 pages.
Duncan, David P. "Motion Compensation of Synthetic Aperture Radar", Microwave Earth Remote Sensing Laboratory, Brigham Young University, Apr. 15, 2003, 5 pages.
Espina, Javier et al., "Wireless Body Sensor Network for Continuous Cuff-less Blood Pressure Monitoring", International Summer School on Medical Devices and Biosensors, 2006, 5 pages.
Fan, Tenglong et al., "Wireless Hand Gesture Recognition Based on Continuous-Wave Doppler Radar Sensors", IEEE Transactions on Microwave Theory and Techniques, Plenum, USA, vol. 64, No. 11, pp. 4012-4012, XP011633246, ISSN: 0018-9480, DOI: 10.1109/TMTT.2016.2610427, Nov. 1, 2016, 9 pages.
Farringdon, Jonny et al., "Wearable Sensor Badge & Sensor Jacket for Context Awareness", Third International Symposium on Wearable Computers, Sep. 2000, 7 pages.
Felch, Andrew et al., "Standard Radar API: Proposal Version 0.1", Technical Disclosure Commons, Jan. 24, 2021, 18 pages.
Garmatyuk, Dmitriy S. et al., "Ultra-Wideband Continuous-Wave Random Noise Arc-SAR", IEEE Transaction on Geoscience and Remote Sensing, vol. 40, No. 12, Dec. 2002, 10 pages.
Geisheimer, Jonathan L. et al., "A Continuous-Wave (CW) Radar for Gait Analysis", IEEE 2001, 2001, 5 pages.
Godana, Bruhtesfa E. "Human Movement Characterization in Indoor Environment using GNU Radio Based Radar", Nov. 30, 2009, 100 pages.
Guerra, Anna et al., "Millimeter-Wave Personal Radars for 3D Environment Mapping", 48th Asilomar Conference on Signals, Systems and Computer, Nov. 2014, pp. 701-705.
Gürbüz, Sevgi Z. et al., "Detection and Identification of Human Targets in Radar Data", Proc. SPIE 6567, Signal Processing, Sensor Fusion, and Target Recognition XVI, 656701, May 7, 2007, 12 pages.
He, David D. "A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute Of Technology Available at: <http://dspace.mit.edu/handle/1721.1/79221, 137 pages.
Holleis, Paul et al., "Evaluating Capacitive Touch Input on Clothes", Proceedings of the 10th International Conference on Human Computer Interaction, Jan. 1, 2008, 10 pages.
Holleis, Paul et al., "Evaluating Capacitive Touch Input on Clothes", Proceedings of the 10th International Conference on Human Computer Interaction With Mobile Devices and Services, p. 81, XP055223937, New York, NY, US; DOI: 10.1145/1409240.1409250; ISBN: 978-1-59593-952-4, Jan. 1, 2008, 11 pages.
Hollington, Jessie "Playing back all songs on iPod", retrieved at: https://www.ilounge.com/index.php/articles/cornments/playing-back-all-songs-on-ipod, Aug. 22, 2008, 2 pages.
Ishijima, Masa "Unobtrusive Approaches to Monitoring Vital Signs at Home", Medical & Biological Engineering and Computing, Springer, Berlin, DE, vol. 45, No. 11 as cited in search report for PCT/US2016/013968 dated Jul. 28, 2016, Sep. 26, 2007, 3 pages.

(56) References Cited

OTHER PUBLICATIONS

Karagozler, Mustafa E. et al., "Embedding Radars in Robots to Accurately Measure Motion", Technical Disclosure Commons; Retrieved from http://www.tdcommons.org/dpubs_series/454, Mar. 30, 2017, 8 pages.
Klabunde, Richard E. "Ventricular Pressure-Volume Loop Changes in Valve Disease", Retrieved From <https://web.archive.org/web/20101201185256/http://cvphysiology.com/Heart%20Disease/HD009.htm>, Dec. 1, 2010, 8 pages.
Kubota, Yusuke et al., "A Gesture Recognition Approach by using Microwave Doppler Sensors", IPSJ SIG Technical Report, 2009 (6), Information Processing Society of Japan, Apr. 15, 2010, pp. 1-8, 12 pages.
Lee, Cullen E. "Computing the Apparent Centroid of Radar Targets", Sandia National Laboratories; Presented at the Proceedings of the 1996 IEEE National Radar Conference: Held at the University of Michigan, May 1996, 21 pages.
Lien, Jaime et al., "Embedding Radars in Robots for Safety and Obstacle Detection", Technical Disclosure Commons; Retrieved from http://www.tdcommons.org/dpubs_series/455, Apr. 2, 2017, 10 pages.
Lien, Jaime et al., "Soli: Ubiquitous Gesture Sensing with Millimeter Wave Radar", ACM Transactions on Graphics (TOG), ACM, Us, vol. 35, No. 4, XP058275791, ISSN: 0730-0301, DOI: 10.1145/2897824.2925953, Jul. 11, 2016, 19 pages.
Martinez-Garcia, Hermino et al., "Four-quadrant linear-assisted DC/DC voltage regulator", Analog Integrated Circuits and Signal Processing, Springer New York LLC, US, vol. 88, No. 1, Apr. 23, 2016 (Apr. 23, 2016)pp. 151-160, XP035898949, ISSN: 0925-1030, DOI: 10.1007/S10470-016-0747-8, Apr. 23, 2016, 10 pages.
Matthews, Robert J. "Venous Pulse", Retrieved at: http://www.rjmatthewsmd.com/Definitions/venous_pulse.htm—on Nov. 30, 2016, Apr. 13, 2013, 7 pages.
Nakajima, Kazuki et al., "Development of Real-Time Image Sequence Analysis for Evaluating Posture Change and Respiratory Rate of a Subject in Bed", In Proceedings: Physiological Measurement, vol. 22, No. 3; Retrieved From: <http://iopscience.iop.org/0967-3334/22/3/401/pdf/0967-3334_22_3_401.pdf> Feb. 27, 2015, 8 pages.
Narasimhan, Shar "Combining Self- & Mutual-Capacitive Sensing for Distinct User Advantages", Retrieved from the Internet: URL:http://www.designnews.com/author.asp?section_id=1365&doc_id=271356&print=yes [retrieved on Oct. 1, 2015], Jan. 31, 2014, 5 pages.
Otto, Chris et al., "System Architecture of a Wireless Body Area Sensor Network for Ubiquitous Health Monitoring", Journal of Mobile Multimedia; vol. 1, No. 4, Jan. 10, 2006, 20 pages.
Palese, et al., "The Effects of Earphones and Music on the Temperature Measured by Infrared Tympanic Thermometer: Preliminary Results", ORL—head and neck nursing: official journal of the Society of Otorhinolaryngology and Head-Neck Nurses 32.2, Jan. 1, 2013, pp. 8-12.
Patel, P C. et al., "Applications of Electrically Conductive Yarns in Technical Textiles", International Conference on Power System Technology (POWECON), Oct. 30, 2012, 6 pages.
Poh, Ming-Zher et al., "A Medical Mirror for Non-contact Health Monitoring", In Proceedings: ACM SIGGRAPH Emerging Technologies, Jan. 1, 2011, 1 page.
Poh, Ming-Zher et al., "Non-contact, Automated Cardiac Pulse Measurements Using Video Imaging and Blind Source Separation.", In Proceedings: Optics Express, vol. 18, No. 10, May 7, 2010, 13 pages.
Pu, Qifan et al., "Gesture Recognition Using Wireless Signals", Oct. 2014, pp. 15-18.
Pu, Qifan et al., "Whole-Home Gesture Recognition Using Wireless Signals", MobiCom'13, Sep. 30-Oct. 4, Miami, FL, USA, 12 pages.
Pu, Qifan et al., "Whole-Home Gesture Recognition Using Wireless Signals", MobiCom'3, Sep. 30-Oct. 4, Miami, FL, USA, 2013, 12 pages.
Pu, Qifan et al., "Whole-Home Gesture Recognition Using Wireless Signals", Proceedings of the 19th annual international conference on Mobile computing & networking (MobiCom'13), US, ACM, pp. 27-38, Sep. 30, 2013, 12 pages.
Pu, Quifan et al., "Whole-Home Gesture Recognition Using Wireless Signals", MobiCom '13 Proceedings of the 19th annual international conference on Mobile computing & networking, Aug. 27, 2013, 12 pages.
Schneegass, Stefan et al., "Towards a Garment OS: Supporting Application Development for Smart Garments", Wearable Computers, ACM, Sep. 13, 2014, 6 pages.
Skolnik, Merrill I. "CW and Frequency-Modulated Radar", In: "Introduction To Radar Systems", McGraw Hill, XP055047545, ISBN: 978-0-07-057909-5 pp. 68-100, p. 95-p. 97, Jan. 1, 1981, 18 pages.
Stoppa, Matteo "Wearable Electronics and Smart Textiles: A Critical Review", In Proceedings of Sensors, vol. 14, Issue 7, Jul. 7, 2014, pp. 11957-11992.
Wang, Wenjin et al., "Exploiting Spatial Redundancy of Image Sensor for Motion Robust rPPG", In Proceedings: IEEE Transactions on Biomedical Engineering, vol. 62, Issue 2, Jan. 19, 2015, 11 pages.
Wang, Yazhou et al., "Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.
Wijesiriwardana, R et al., "Capacitive Fibre-Meshed Transducer for. Touch & Proximity Sensing Applications", IEEE Sensors Journal, IEEE Service Center, Oct. 1, 2005, 5 pages.
Zhadobov, Maxim et al., "Millimeter-Wave Interactions with the Human Body: State of Knowledge and Recent Advances", International. Journal of Microwave and Wireless Technologies, p. 1 of 11. # Cambridge University Press and the European Microwave Association, 2011; doi:10.1017/S1759078711000122, 2011.
Zhadobov, Maxim et al., "Millimeter-wave Interactions with the Human Body: State of Knowledge and Recent Advances", International Journal of Microwave and Wireless Technologies, Mar. 1, 2011, 11 pages.
Zhang, Ruquan et al., "Study of the Structural Design and Capacitance Characteristics of Fabric Sensor", Advanced Materials Research (vols. 194-196), Feb. 21, 2011, 8 pages.
Zheng, Chuan et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO), IEEE, XP032574214, DOI: 10.1109/IMWS-BIO.2013.6756200, Dec. 9, 2013, 3 Pages.
"Foreign Office Action", KR Application No. 10-2021-7037016, dated Dec. 23, 2021, 6 pages.
"Non-Final Office Action", U.S. Appl. No. 17/023,122, dated Jan. 24, 2022, 25 pages.
Pursuant to MPEP § 2001.6(b) the applicant brings the following co-pending application to the Examiner's attention: U.S. Appl. No. 17/500,747.
Pursuant to MPEP § 2001.6(b) the applicant brings the following co-pending application to the Examiner's attention: U.S. Appl. No. 17/488,015.
"Non-Final Office Action", U.S. Appl. No. 17/506,605, dated Jul. 27, 2022, 7 pages.
"Non-Final Office Action", U.S. Appl. No. 17/119,312, dated Sep. 2, 2022, 6 pages.
"Notice of Allowance", U.S. Appl. No. 17/361,824, dated Jun. 9, 2022, 9 pages.
"Foreign Office Action", JP Application No. 2021-85256, dated Nov. 15, 2022, 13 pages.
"Foreign Office Action", EP Application No. 16784352.3, dated Nov. 29, 2022, 5 pages.
"Non-Final Office Action", U.S. Appl. No. 17/023,122, dated Sep. 16, 2022, 10 pages.
"Non-Final Office Action", U.S. Appl. No. 17/500,747, dated Nov. 10, 2022, 32 pages.
"Non-Final Office Action", U.S. Appl. No. 17/488,015, dated Nov. 10, 2022, 47 pages.

(56) References Cited

OTHER PUBLICATIONS

"Notice of Allowance", U.S. Appl. No. 17/119,312, dated Jan. 13, 2023, 5 pages.
"Notice of Allowance", U.S. Appl. No. 17/506,605, dated Oct. 19, 2022, 5 pages.
"Foreign Office Action", CN Application No. 202010090233.0, dated Mar. 31, 2023, 10 pages.
"Non-Final Office Action", U.S. Appl. No. 17/517,978, dated Apr. 24, 2023, 6 pages.
"Notice of Allowance", U.S. Appl. No. 17/488,015, dated Mar. 1, 2023, 5 pages.
"Notice of Allowance", U.S. Appl. No. 17/500,747, dated Mar. 1, 2023, 5 pages.
"Notice of Allowance", U.S. Appl. No. 17/023,122, dated Mar. 6, 2023, 9 pages.

\* cited by examiner

GESTURE RECOGNITION USING MULTIPLE ANTENNA

RELATED APPLICATIONS

This application is a continuation application and claims priority to U.S. patent application Ser. No. 17/005,207 filed on Aug. 27, 2020 which in turn claims priority to U.S. patent application Ser. No. 15/093,533 filed on Apr. 7, 2016, which claims priority to U.S. Provisional Patent Application Ser. No. 62/237,975 filed on Oct. 6, 2015, the disclosures of which are incorporated by reference herein in their entireties.

BACKGROUND

This background description is provided for the purpose of generally presenting the context of the disclosure. Unless otherwise indicated herein, material described in this section is neither expressly nor impliedly admitted to be prior art to the present disclosure or the appended claims.

As computing devices evolve with more computing power, they are able to evolve how they receive input commands or information. One type of evolving input mechanism relates to capturing user gestures. For instance, a user can attach a first peripheral device to their arm or hand that reads muscle activity, or hold a second peripheral device that contains an accelerometer that detects motion. In turn, these peripherals then communicate with a receiving computing device based upon a detected gesture. With these types of peripheral devices, a user physically connects the peripheral device to a corresponding body part that performs the gesture. However, this constrains the user, in that the user must not only acquire these peripheral devices, but must couple them to the receiving computing device. Thus, it would be advantageous to capture various gestures without attaching a peripheral device to the user.

SUMMARY

This Summary is provided to introduce a selection of concepts in a simplified form that are further described below in the Detailed Description. This Summary is not intended to identify key features or essential features of the claimed subject matter.

Various embodiments wirelessly detect micro gestures using multiple antennas of a gesture sensor device. At times, the gesture sensor device transmits multiple outgoing radio frequency (RF) signals, each outgoing RF signal transmitted via a respective antenna of the gesture sensor device. The outgoing RF signals are configured to help capture information that can be used to identify micro-gestures performed by a hand. The gesture sensor device captures incoming RF signals generated by the outgoing RF signals reflecting off of the hand, and then analyzes the incoming RF signals to identify the micro-gesture.

One or more embodiments provide a device configured to identify a micro-gesture associated with a target object, the device comprising: at least two antennas to respectively transmit a plurality of outgoing radio frequency (RF) signals, each antenna configured to: transmit a respective outgoing radio frequency (RF) signal of the plurality of outgoing RF signals; and receive an incoming RF signal generated by at least one transmitted outgoing RF signal of the plurality of outgoing RF signals reflecting off the target object; a digital signal processing component configured to: process a first set of data originating from incoming RF signals to extract information about the target object; and a machine-learning component configured to: receive the information extracted by the digital signal processing component; and process the information to identify the micro-gesture.

At least one embodiment provides a method for identifying a micro-gesture performed by a hand, the method comprising: transmitting a plurality of outgoing RF signals, each outgoing RF signal transmitted on a respective antenna of a plurality of antennas; capturing at least two incoming RF signals generated by at least two outgoing RF signals of the plurality of outgoing RF signals reflecting off the hand; and processing the at least two captured incoming RF signals to identify the micro-gesture performed by the hand.

At least one embodiment provides a device for detecting a micro-gesture performed by a hand, the device comprising: a gesture sensor component comprising: at least two antenna, each respective antenna associated with a respective transceiver path; at least one processor; one or more computer-readable storage devices; and one or more Application Programming Interfaces (APIs) stored on the one or more computer-readable storage devices which, responsive to execution by the at least one processor, configure the gesture sensor component to detect the micro-gesture by causing the gesture sensor component to perform operations comprising: transmitting a plurality of outgoing radio frequency (RF) signals, each outgoing radio frequency (RF) signal being transmitted on a respective antenna of the at least two antenna; receiving at least two incoming RF signals originating from at least two outgoing RF signals of the plurality of outgoing RF signals reflecting off the hand; and processing the at least two RF signals to detect the micro-gesture by processing data from at least two respective transceiver paths.

At least one embodiment provides a device configured to identify a micro-gesture associated with a target object, the device comprising: means for transmitting each respective outgoing radio frequency (RF) signal of a plurality of outgoing RF signals on a respective antenna; means for receiving incoming RF signals generated by at least some of the plurality of outgoing RF signals reflecting off the target object; means for processing a first set of data originating from incoming RF signals to extract information about the target object; and means for processing the information to identify the micro-gesture.

BRIEF DESCRIPTION OF THE DRAWINGS

Various aspects of wireless micro-gesture detection are described with reference to the following drawings. The same numbers are used throughout the drawings to reference like features and components.

DETAILED DESCRIPTION

Overview

Various embodiments wirelessly detect or recognize micro-gestures, e.g., hand gestures, using multiple antennas of a gesture sensor device. These micro-gestures can be detected in free-space, without any attachment or peripheral device connected to a corresponding body part, such as a hand. For example, hand gestures can be detected by a component of a computing device to which input via a hand gesture is directed. In turn, detected hand gestures can be forwarded as input commands or information to the computing device, a software application executing on the computing device, and the like. Other embodiments wirelessly detect macro-gestures or movements, such as a hand wave, a head turn, and so forth. At times, the gesture sensor device transmits each respective RF signal of the plurality of RF signals on a respective antenna of the multiple antennas. In some embodiments, how the RF signals are configured can enhance the quality of information that can be extracted relative to information extracted when using a random RF signal. In turn, the enhanced information can be used to identify micro-gestures of a hand or portions of the hand. For instance, some embodiments provide enough detection resolution to identify micro-gestures performed by finger(s) of a hand while the body of the hand is stationary. Sometimes, the configuration of the RF signals is based upon information extraction techniques, such as those that use radar signals. Upon transmitting the RF signals, the gesture sensor device captures, using the multiple antennas, RF signals generated by the transmitted RF signals reflecting off of the hand. In some cases, the gesture sensor device employs a pipeline that receives raw input data representing the captured RF signals, and extracts information about the hand at different levels of resolution with respective stages contained within the pipeline. The pipeline can employ various types of algorithms, such as digital signal processing algorithms and machine-learning algorithms. Some embodiments provide an ability to modify how the gesture sensor device configures the transmitted RF signals, what type of information the gesture sensor extracts, what algorithms are employed to extract the information, how the information is interpreted, and so forth.

In the following discussion, an example environment is first described in which various embodiments can be employed. Following this is a discussion of example RF signal propagation properties and how they can be employed in accordance with one or more embodiments. After this, wireless micro-gesture techniques are described. Finally, an example device is described in which various embodiments of wireless hand gesture detection can be employed.

Example Environment

Figure 1:
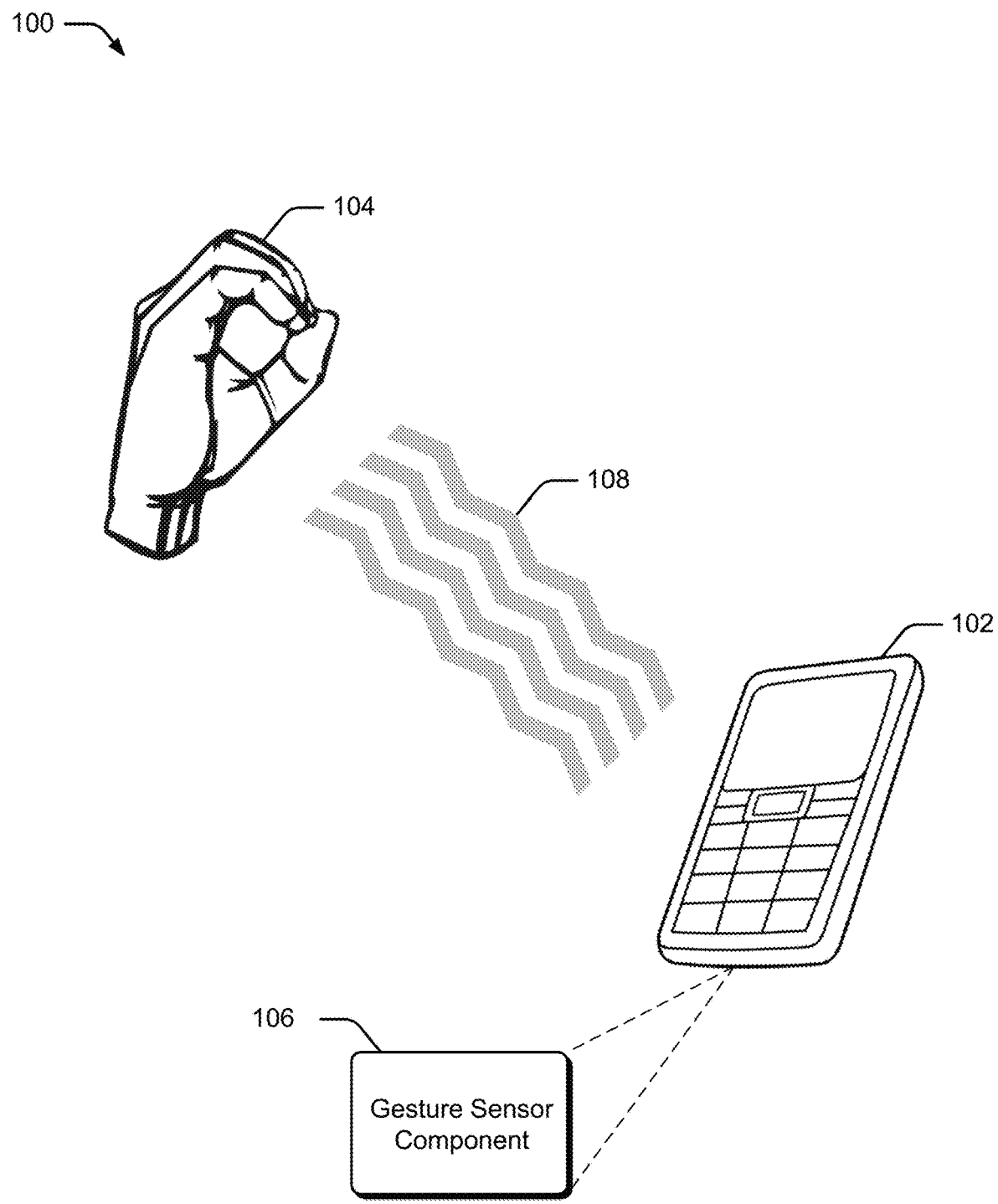
FIG. 1 illustrates an example environment that employs wireless micro-gesture detection in accordance with one or more embodiments.

FIG. 1 illustrates an example environment 100 in which wireless hand gesture detection can be employed. The example environment 100 includes a computing device 102 having a gesture sensor component 106 capable of wirelessly sensing gestures performed by hand 104. In this example environment, computing device 102 is illustrated as a mobile device, but it is to be appreciated that this is merely for discussion purposes, and that other devices can be utilized without departing from the scope of the claimed subject matter.

Gesture sensor component 106 represents functionality that wirelessly captures characteristics of a target object, illustrated here as hand 104. In this example, gesture sensor component 106 is a hardware component 106 of computing device 102. In some cases, gesture sensor component 106 not only captures characteristics about hand 104, but can additionally identify a specific gesture performed by hand 104 from other gestures. Any suitable type of characteristic or gesture can be captured or identified, such as an associated size of the hand, a directional movement of the hand, a micro-gesture performed by all or a portion of the hand (i.e., a single-tap gesture, a double-tap gesture, a left-swipe, a forward-swipe, a right-swipe, a finger making a shape, etc.), and so forth. The term micro-gesture is used to signify a gesture that can be identified from other gestures based on differences in movement using a scale on the order of millimeters to sub-millimeters. Alternately or additionally, gesture sensor component 106 can be configured to identify gestures on a larger scale than a micro-gesture (i.e., a macro-gesture that is identified by differences with a coarser resolution than a micro-gesture, such as differences measured in centimeters or meters).

Hand 104 represents a target object that gesture sensor component 106 is in process of detecting. Here, hand 104 resides in free-space with no devices attached to it. Being in free-space, hand 104 has no physical devices attached to it that couple to, or communicate with, computing device 102 and/or gesture sensor component 106. While this example is described in the context of detecting hand 104, it is to be appreciated that gesture sensor component 106 can be used to capture characteristics of any other suitable type of target object.

Signals 108 generally represent multiple RF signals transmitted and received by gesture sensor component 106. In some embodiments, gesture sensor component 106 transmits radar signals, each on a respective antenna, that are directed towards hand 104. As the transmitted signals reach hand 104, at least some reflect back to gesture sensor component 106 and are processed, as further described below. Signals 108 can have any suitable combination of energy level, carrier frequency, burst periodicity, pulse width, modulation type, waveform, phase relationship, and so forth. In some cases, some or all of the respective signals transmitted in signals 108 differs from one another to create a specific diversity scheme, such as a time diversity scheme that transmits multiple versions of a same signal at different points in time, a frequency diversity scheme that transmits signals using several different frequency channels, a space diversity scheme that transmits signals over different propagation paths, and so forth.

Figure 2:
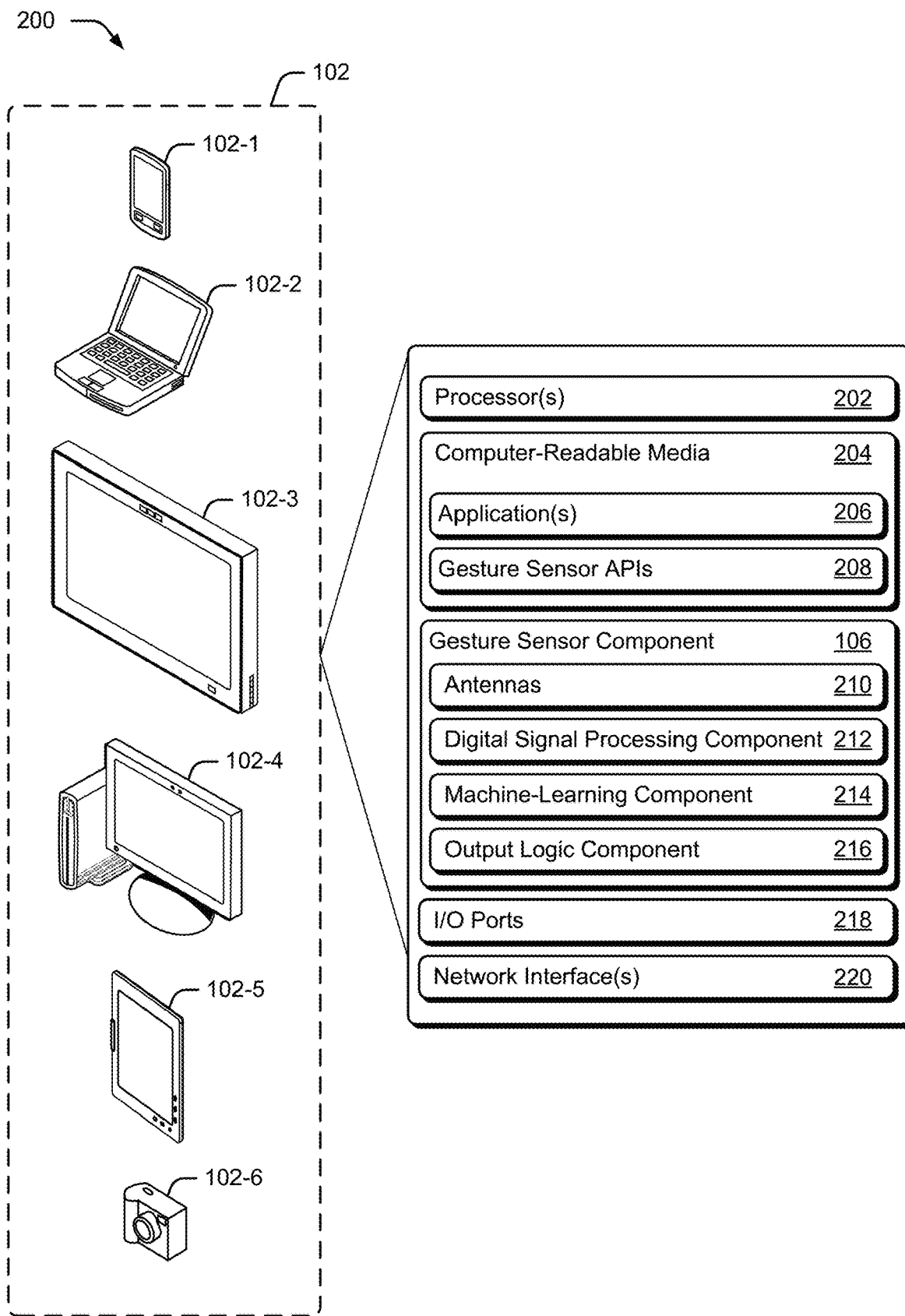
FIG. 2 illustrates an example implementation of a computing device of FIG. 1 in greater detail in accordance with one or more embodiments.

Having generally described an environment in which wireless hand gesture detection may be implemented, now consider FIG. 2, which illustrates an example implementation of computing device 102 of FIG. 1 in greater detail. As discussed above, computing device 102 represents any suitable type of computing device in which various embodiments can be implemented. In this example, various devices include, by way of example and not limitation: smartphone 102-1, laptop 102-2, television 102-3, desktop 102-4, tablet 102-5, and camera 102-6. It is to be appreciated that these are merely examples for illustrative purposes, and that any other suitable type of computing device can be utilized without departing from the scope of the claimed subject matter, such as a gaming console, a lighting system, an audio system, etc.

Computing device 102 includes processor(s) 202 and computer-readable media 204. Application(s) 206 and/or an operating system (not shown) embodied as computer-readable instructions on the computer-readable media 204 can be executed by the processor(s) 202 to provide some or all of the functionalities described herein.

Computer-readable media 204 also includes gesture sensor Application Programming Interfaces (APIs) 208 to provide programming access into various routines and tools provided by gesture sensor component 106. In some embodiments, gesture sensor APIs 208 provide high-level access into gesture sensor component 106 in order to abstract implementation details and/or hardware access from a calling program, request notifications related to identified events, query for results, and so forth. Gesture sensor APIs 208 can also provide low-level access to gesture sensor component 106, where a calling program can control direct or partial hardware configuration of gesture sensor component 106. In some cases, gesture sensor APIs 208 provide programmatic access to input configuration parameters that configure transmit signals (i.e., signals 108 of FIG. 1) and/or select gesture recognition algorithms. These APIs enable programs, such as application(s) 206, to incorporate the functionality provided by gesture sensor component 106 into executable code. For instance, application(s) 206 can call or invoke gesture sensor APIs 208 to register for, or request, an event notification when a particular micro-gesture has been detected, enable or disable wireless gesture recognition in computing device 102, and so forth. At times, gesture sensor APIs 208 can access and/or include low level hardware drivers that interface with hardware implementations of gesture sensor component 106. Alternately or additionally, gesture sensor APIs 208 can be used to access various algorithms that reside on gesture sensor component 106 to perform additional functionality or extract additional information, such as 3D tracking information, angular extent, reflectivity profiles from different aspects, correlations between transforms/features from different channels, and so forth.

Gesture sensor component 106 represents functionality that wirelessly detects micro-gestures performed by a hand. Gesture sensor component 106 can be implemented as a chip embedded within computing device 102. However, it is to be appreciated that gesture sensor component can be implemented in any other suitable manner, such as one or more Integrated Circuits (ICs), as a System-on-Chip (SoC), as a processor with embedded processor instructions or configured to access processor instructions stored in memory, as hardware with embedded firmware, a printed circuit board with various hardware components, or any combination thereof. Here, gesture sensor component 106 includes antennas 210, digital signal processing component 212, machine-learning component 214, and output logic component 216. In some embodiments, gesture sensor component 106 uses these various components in concert (such as a pipeline) to wirelessly detect hand gestures using radar techniques based on multiple signals.

Antennas 210 transmit and receive RF signals. As one skilled in the art will appreciate, this is achieved by converting electrical signals into electromagnetic waves for transmission, and vice versa for reception. Gesture sensor component 106 can include any suitable number of antennas in any suitable configuration. For instance, any of the antennas can be configured as a dipole antenna, a parabolic antenna, a helical antenna, a monopole antenna, and so forth. In some embodiments, antennas 210 are constructed on-chip (e.g., as part of an SoC), while in other embodiments, antennas 210 are components, metal, hardware, etc. that attach to gesture sensor component 106. The placement, size, and/or shape of antennas 210 can be chosen to enhance a specific transmission pattern or diversity scheme, such as a pattern or scheme designed to capture information about a micro-gesture performed by the hand, as further described above and below. In some cases, the antennas can be physically separated from one another by a distance that allows gesture sensor component 106 to collectively transmit and receive signals directed to a target object over different channels, different radio frequencies, and different distances. In some cases, antennas 210 are spatially distributed to support triangulation techniques, while in others the antennas are collocated to support beamforming techniques. While not illustrated, each antenna can correspond to a respective transceiver path that physically routes and manages the outgoing signals for transmission and the incoming signals for capture and analysis.

Digital signal processing component 212 generally represents functionality that digitally captures and processes a signal. For instance, digital signal processing component 212 performs sampling on RF signals received by antennas 210 to generate digital samples that represent the RF signals, and processes the digital samples to extract information about the target object. Alternately or additionally, digital signal processing component 212 controls the configuration of signals transmitted via antennas 210, such as configuring a plurality of signals to form a specific diversity scheme, such as a beamforming diversity scheme. In some cases, digital signal processing component 212 receives input configuration parameters that control an RF signal's transmission parameters (e.g., frequency channel, power level, etc.), such as through gesture sensor APIs 208. In turn, digital signal processing component 212 modifies the RF signal based upon the input configuration parameter. At times, the signal processing functions of digital signal processing component 212 are included in a library of signal processing functions or algorithms that are also accessible and/or configurable via gesture sensor APIs 208. Digital signal processing component 212 can be implemented in hardware, software, firmware, or any combination thereof.

Among other things, machine-learning component 214 receives information processed or extracted by digital signal processing component 212, and uses that information to classify or recognize various aspects of the target object, as further described below. In some cases, machine-learning component 214 applies one or more algorithms to probabilistically determine which gesture has occurred given an input signal and previously learned gesture features. As in the case of digital-signal processing component 212, machine-learning component 214 can include a library of multiple machine-learning algorithms, such as a Random Forrest algorithm, deep learning algorithms (i.e. artificial neural network algorithms, convolutional neural net algorithms, etc.), clustering algorithms, Bayesian algorithms, and so forth. Machine-learning component 214 can be trained on how to identify various gestures using input data that consists of example gesture(s) to learn. In turn, machine-learning component 214 uses the input data to learn what features can be attributed to a specific gesture. These features are then used to identify when the specific gesture occurs. In some embodiments, gesture sensor APIs 208 can be used to configure machine-learning component 214 and/or its corresponding algorithms.

Output logic component 216 represents functionality that uses logic to filter output information generated by digital signal processing component 212 and machine-learning component 214. In some cases, output logic component 216 uses knowledge about the target object to further filter or identify the output information. For example, consider a case where the target object is a hand repeatedly performing a tap gesture. Depending upon its configuration, output logic component 216 can filter the repeated tap gesture into a single output event indicating a repeated tap gesture, or repeatedly issue a single-tap gesture output event for each tap gesture identified. This can be based on knowledge of the target object, user input filtering configuration information, default filtering configuration information, and so forth. In some embodiments, the filtering configuration information of output logic component 216 can be modified via gesture sensor APIs 208.

Computing device 102 also includes I/O ports 218 and network interfaces 220. I/O ports 218 can include a variety of ports, such as by way of example and not limitation, high-definition multimedia (HDMI), digital video interface (DVI), display port, fiber-optic or light-based, audio ports (e.g., analog, optical, or digital), Universal Serial Bus (USB) ports, serial advanced technology attachment (SATA) ports, peripheral component interconnect (PCI) express based ports or card slots, serial ports, parallel ports, or other legacy ports. Computing device 102 may also include the network interface(s) 220 for communicating data over wired, wireless, or optical networks. By way of example and not limitation, the network interface(s) 220 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Having described computing device 102 in accordance with one or more embodiments, now consider a discussion of using wireless detection of an object in accordance with one or more embodiments.

Propagation of RF Signals

As technology advances, users have an expectation that new devices will provide additional freedoms and flexibility over past devices. One such example is the inclusion of wireless capabilities in a device. Consider the case of a wireless mouse input device. A wireless mouse input device receives input from a user in the format of button clicks and movement in position, and wirelessly transmits this information to a corresponding computing device. The wireless nature obviates the need to have a wired connection between the wireless mouse input device and the computing device, which gives more freedom to the user with the mobility and placement of the mouse. However, the user still physically interacts with the wireless mouse input device as a way to enter input into the computing device. Accordingly, if the wireless mouse input device gets lost or is misplaced, the user is unable to enter input with that mechanism. Thus, removing the need for a peripheral device as an input mechanism gives additional freedom to the user. One such example is performing input to a computing device via a hand gesture.

Hand gestures provide a user with a simple and readily available mechanism to input commands to a computing device. However, detecting hand gestures can pose certain problems. For example, attaching a movement sensing device to a hand does not remove a user's dependency upon a peripheral device. Instead, it is a solution that simply trades one input peripheral for another. As an alternative, cameras can capture images, which can then be compared and analyzed to identify the hand gestures. However, this option may not yield a fine enough resolution to detect micro-gestures. An alternate solution involves usage of radar systems to transmit RF signals to a target object, and determine information about that target based upon an analysis of the reflected signal.

Various embodiments wirelessly detect hand gestures using multiple antenna. Each antenna can be configured to transmit a respective RF signal to enable detection of a micro-gesture performed by a hand. In some embodiments, the collective transmitted RF signals are configured to radiate a specific transmission pattern or specific diversity scheme. RF signals reflected off of the hand can be captured by the antenna, and further analyzed to identify temporal variations in the RF signals. In turn, these temporal variations can be used to identify micro-gestures.

Figure 3:
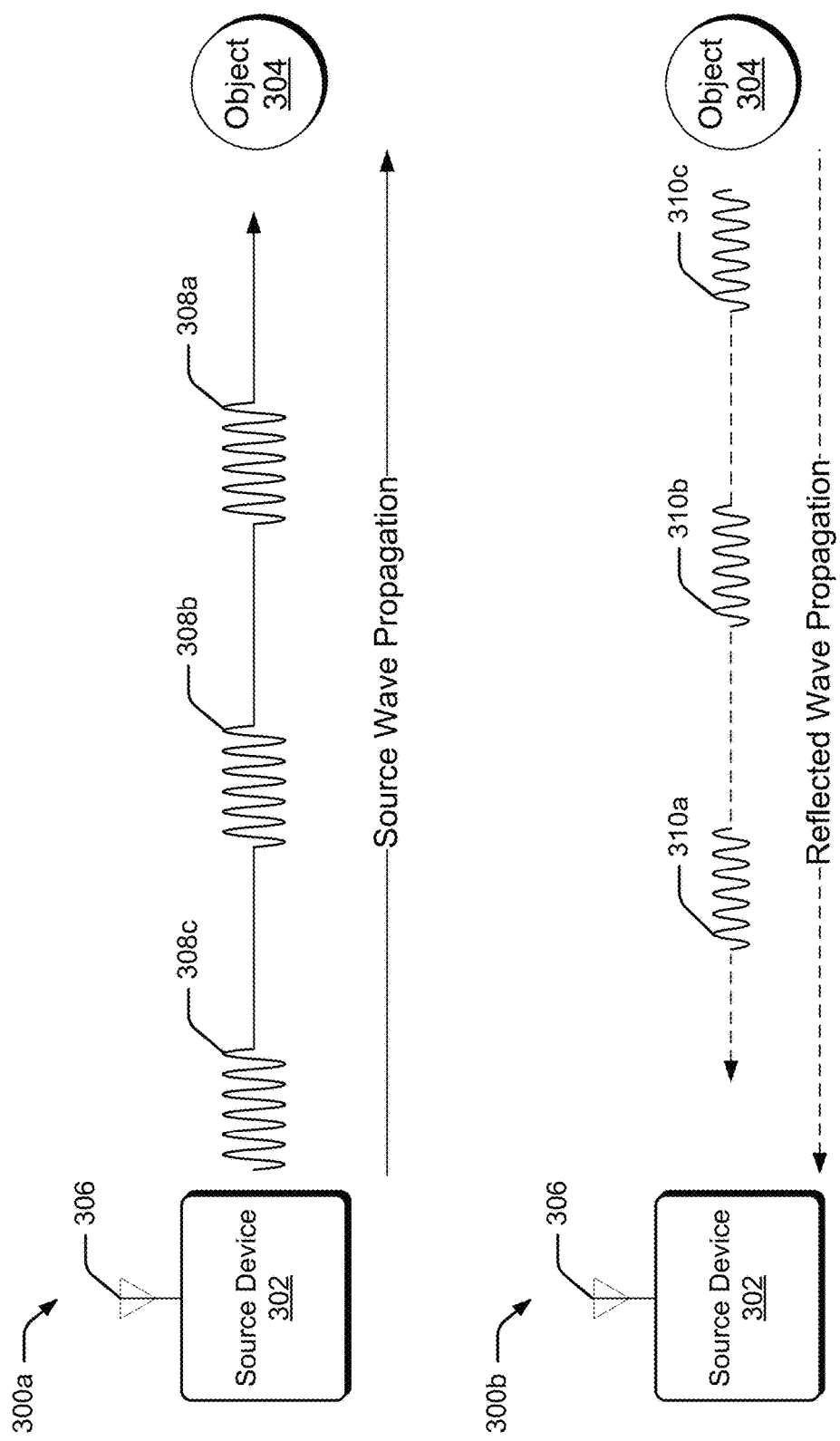
FIG. 3 illustrates an example of general signal properties.

Consider FIG. 3 which illustrates a simple example of RF wave propagation, and a corresponding reflected wave propagation. It is to be appreciated that the following discussion has been simplified, and is not intended to describe all technical aspects of RF wave propagation, reflected wave propagation, or detection techniques.

Environment 300a includes source device 302 and object 304. Source device 302 includes antenna 306, which is configured to transmit and receive electromagnetic waves in the form of an RF signal. In this example, source device 302 transmits a series of RF pulses, illustrated here as RF pulse 308a, RF pulse 308b, and RF pulse 308c. As indicated by their ordering and distance from source device 302, RF pulse 308a is transmitted first in time, followed by RF pulse 308b, and then RF pulse 308c. For discussion purposes, these RF pulses have the same pulse width, power level, and transmission periodicity between pulses, but any other suitable type of signal with alternate configurations can be transmitted without departing from the scope of the claimed subject matter.

Generally speaking, electromagnetic waves can be characterized by the frequency or wavelength of their corresponding oscillations. Being a form of electromagnetic radiation, RF signals adhere to various wave and particle properties, such as reflection. When an RF signal reaches an object, it will undergo some form of transition. Specifically, there will be some reflection off the object. Environment 300b illustrates the reflection of RF pulses 308a-308c reflecting off of object 304, where RF pulse 310a corresponds to a reflection originating from RF pulse 308a reflecting off of object 304, RF pulse 310b corresponds to a reflection originating from RF pulse 310b, and so forth. In this simple case, source device 302 and object 304 are stationary, and RF pulses 308a-308c are transmitted via a single antenna (antenna 306) over a same RF channel, and are transmitted directly towards object 304 with a perpendicular impact angle. Similarly, RF pulses 310a-310c are shown as reflecting directly back to source device 302, rather than with some angular deviation. However, as one skilled in the art will appreciate, these signals can alternately be transmitted or reflected with variations in their transmission and reflection directions based upon the configuration of source device 302, object 304, transmission parameters, variations in real-world factors, and so forth. Upon receiving and capturing RF pulses 310a-310c, source device 302 can then analyze the pulses, either individually or in combination, to identify characteristics related to object 304. For example, source device 302 can analyze all of the received RF pulses to obtain temporal information and/or spatial information about object 304. Accordingly, source device 302 can use knowledge about a transmission signal's configuration (such as pulse widths, spacing between pulses, pulse power levels, phase relationships, and so forth), and further analyze a reflected RF pulse to identify various characteristics about object 304, such as size, shape, movement speed, movement direction, surface smoothness, material composition, and so forth.

Figure 4:
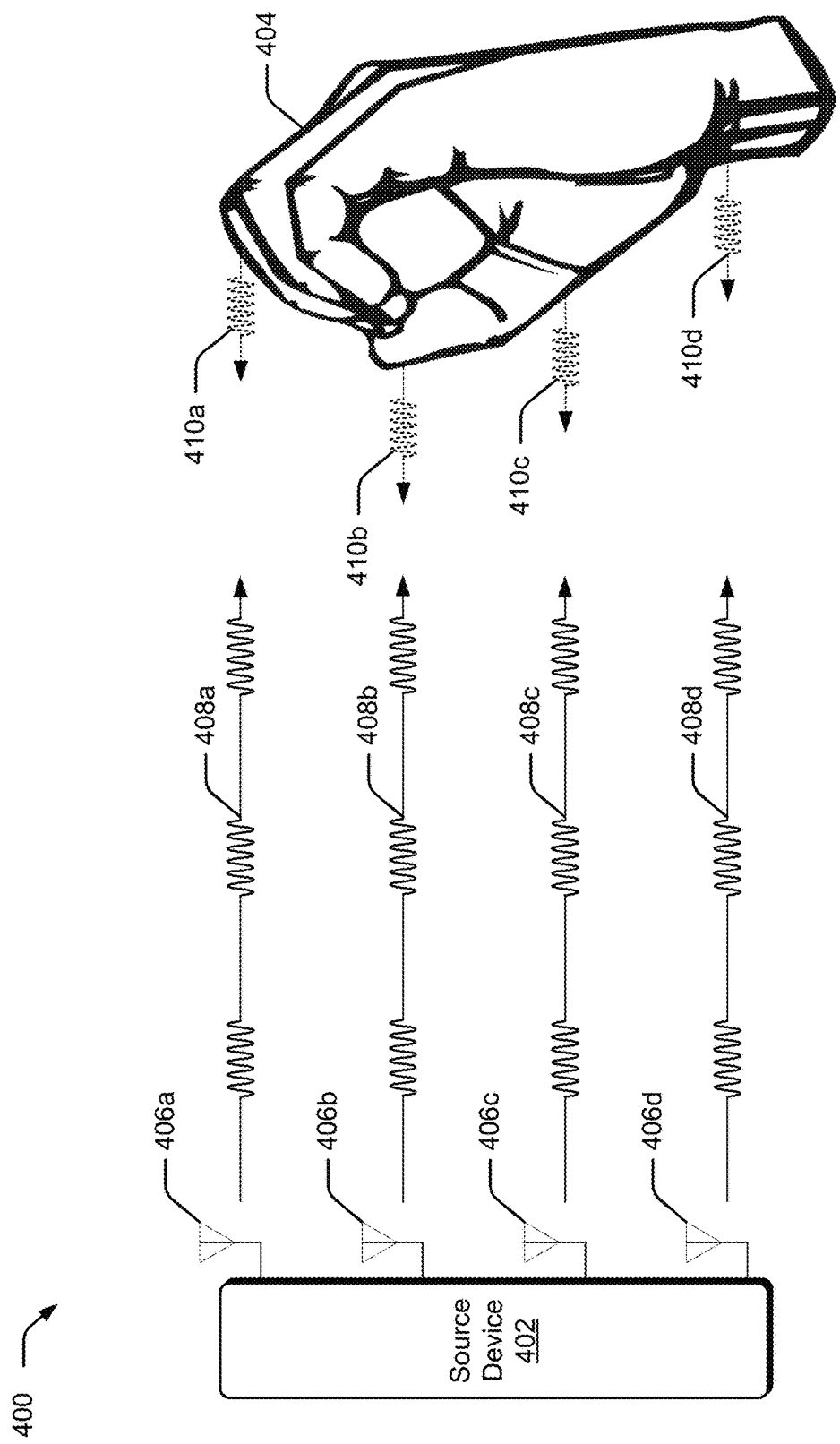
FIG. 4 illustrates an example of general signal properties.

Now consider FIG. 4, which builds upon the above discussion of FIG. 3. FIG. 4 illustrates example environment 400 in which multiple antenna are used to ascertain information about a target object. Environment 400 includes source device 402 and a target object, shown here as hand 404. Generally speaking, source device 402 includes antennas 406a-406d to transmit and receive multiple RF signals. In some embodiments, source device 402 includes gesture sensor component 106 of FIG. 1 and FIG. 2, and antennas 406a-406d correspond to antennas 210. While source device 402 in this example includes four antennas, it is to be appreciated that any suitable number of antennas can be used. Each antenna of antennas 406a-406d is used by source device 402 to transmit a respective RF signal (e.g., antenna 406a transmits RF signal 408a, antenna 406b transmits RF signal 408b, and so forth). As discussed above, these RF signals can be configured to form a specific transmission pattern or diversity scheme when transmitted together. For example, the configuration of RF signals 408a-408d, as well as the placement of antennas 406a-406d relative to a target object, can be based upon beamforming techniques to produce constructive interference or destructive interference patterns, or alternately configured to support triangulation techniques. At times, source device 402 configures RF signals 408a-408d based upon an expected information extraction algorithm, as further described below.

When RF signals 408a-408d reach hand 404, they generate reflected RF signals 410a-410d. Similar to the discussion of FIG. 3 above, source device 402 captures these reflected RF signals, and then analyzes them to identify various properties or characteristics of hand 404, such as a micro-gesture. For instance, in this example, RF signals 408a-408d are illustrated with the bursts of the respective signals being transmitted synchronously in time. In turn, and based upon the shape and positioning of hand 404, reflected signals 410a-410d return to source device 402 at different points in time (e.g., reflected signal 410b is received first, followed by reflected signal 410c, then reflected signal 410a, and then reflected signal 410d). Reflected signals 410a-410d can be received by source device 402 in any suitable manner. For example, antennas 406a-406d can each receive all of reflected signals 410a-410d, or receive varying subset combinations of reflected signals 410a-410d (i.e. antenna 406a receives reflected signal 410a and reflected signal 410d, antenna 406b receives reflected signal 410a, reflected signal 410b, and reflected signal 410c, etc.). Thus, each antenna can receive reflected signals generated by transmissions from another antenna. By analyzing the various return times of each reflected signal, source device 402 can determine shape and corresponding distance information associated with hand 404. When reflected pulses are analyzed over time, source device 402 can additionally discern movement. Thus, by analyzing various properties of the reflected signals, as well as the transmitted signals, various information about hand 404 can be extracted, as further described below. It is to be appreciated that the above example has been simplified for discussion purposes, and is not intended to be limiting.

As in the case of FIG. 3, FIG. 4 illustrates RF signals 408a-408d as propagating at a 90° angle from source device 402 and in phase with one another. Similarly, reflected signals 410a-410d each propagate back at a 90° angle from hand 404 and, as in the case of RF signals 408a-408d, are in phase with one another. However, as one skilled in the art will appreciate, more complex transmission signal configurations, and signal analysis on the reflected signals, can be utilized, examples of which are provided above and below. In some embodiments, RF signals 408a-408d can each be configured with different directional transmission angles, signal phases, power levels, modulation schemes, RF transmission channels, and so forth. These differences result in variations between reflected signals 410a-410d. In turn, these variations each provide different perspectives of the target object which can be combined using data fusion techniques to yield a better estimate of hand 404, how it is moving, its 3-dimensional (3D) spatial profile, a corresponding micro-gesture, etc.

Having described general principles of RF signals which can be used in micro-gesture detection, now consider a discussion of various forms of information extraction that can be employed in accordance with one or more embodiments.

Wireless Detection of Micro-Gestures

The above discussion describes simple examples of RF signal transmission and reflection. In the case of using multiple antenna, it can be seen how transmitting a plurality of RF signals that have variations from one another results in receiving diverse information about a target object from the corresponding reflected signals. The diverse information can then be combined to improve detecting a characteristic or gesture associated with the target object. Accordingly, the system as a whole can exploit or optimize which signals are transmitted to improve the amount of information that can be extracted from the reflected signals. Some embodiments of a gesture sensor component capture raw data representative of signals reflected off a target object. In turn, digital-signal processing algorithms extract information from the raw data, which can then be fed to a machine-learning algorithm to classify a corresponding behavior of the target object. At times, the gesture sensor component utilizes a pipeline to identify or classify a micro-gesture.

Figure 5:
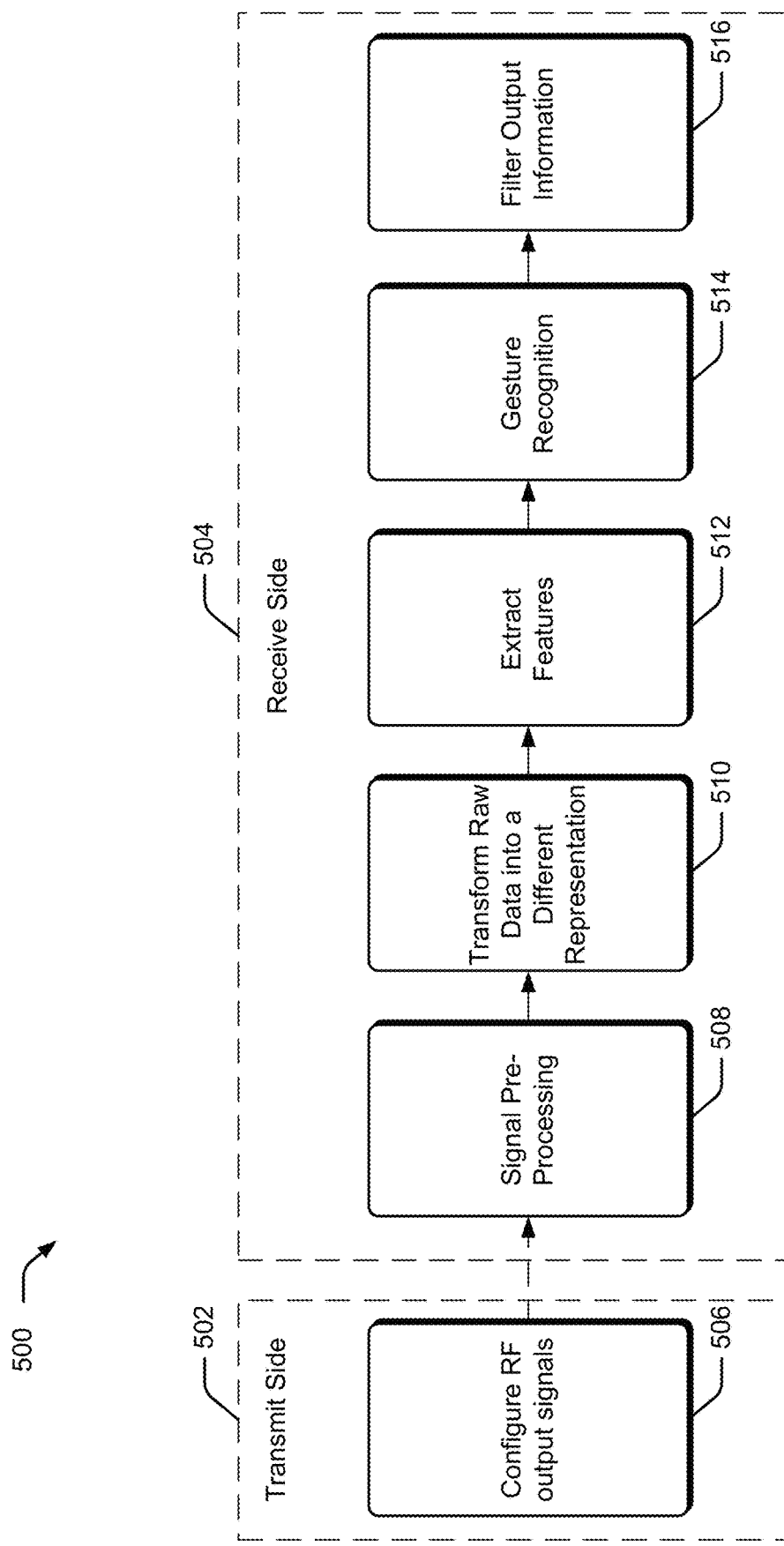
FIG. 5 illustrates an example of a pipeline in accordance with one or more embodiments.

FIG. 5 illustrates the various stages employed by an example pipeline 500 to identify micro-gestures using multiple antenna. In some embodiments, pipeline 500 can be implemented by various components of gesture sensor component 106 of FIGS. 1 and 2, such as antennas 210, digital signal processing component 212, machine-learning component 214, and/or output logic component 216. It is to be appreciated that these stages have been simplified for discussion purposes, and are not intended to be limiting. From one viewpoint, the stages can be grouped into two classifications: transmit side functionality 502 and receive side functionality 504. Generally speaking, the transmit side functionality in the pipeline does not feed directly into the receive side functionality. Instead, the transmit side functionality generates transmit signals which contribute to the reflected signals captured and processed by the receive side functionality, as further described above. Accordingly, the relationship between the transmit side functionality and the receive side functionality is indicated in pipeline 500 through the use of a dotted line to connect stage 506 of the pipeline with stage 508, rather than a solid line, since in various embodiments they are not directly connected with one another.

Stage 506 of the pipeline configures the RF transmit signals. In some cases, various transmission parameters are determined in order to generate the RF transmit signals. At times, the transmission parameters can be based upon an environment in which they are being used. For instance, the transmission parameters can be dependent upon a number of antenna available, the types of antenna available, a target object being detected, directional transmission information, a requested detection resolution, a long range object detection mode, a short range object detection mode, an expected receive-side digital signal processing algorithm, an expected receive-side machine-learning algorithm, physical antenna placement, and so forth. As noted above, the configuration of the RF transmit signals can be dependent upon an expected analysis on the receive side. Thus, the configuration of the RF transmit signals can change to support triangulation location detection methods, beamforming detection methods, and so forth. In some embodiments, the transmission parameters are automatically selected or loaded at startup (e.g., the RF transmit signal configurations are fixed). In other embodiments, these parameters are modifiable, such as through gesture sensor APIs 208 of FIG. 2.

At the start of receive side functionality 504, stage 508 performs signal pre-processing on raw data. For example, as an antenna receives reflected signal(s) (such as antennas 406a-406d receiving some or all of reflected signals 410a-410d of FIG. 4), some embodiments sample the signal(s) and generate a digital representation of the raw (incoming) signals. Upon generating the raw data, stage 508 performs pre-processing to clean up the signals or generate versions of the signals in a desired frequency band, or in a desired format. In some cases, pre-processing includes filtering the raw data to reduce a noise floor or remove aliasing, resampling the data to obtain to a different sample rate, generating a complex representation of the signal(s), and so forth. In some cases, stage 508 automatically pre-processes the raw data based upon default parameters, while in other cases the type of pre-processing is modifiable, such as through gesture sensor APIs 208 of FIG. 2.

Stage 510 transforms the received signal data into one or more different representations. Here, the signal(s) pre-processed by stage 508 are fed into stage 510. At times, stage 510 combines data from multiple paths (and corresponding antenna). The combined data can be any combination of "transmit paths", "receive paths", and "transmit and receive paths". Any suitable type of data fusion technique can be used, such as weighted integration to optimize an heuristic (i.e., signal-to-noise (SNR) ratio, minimum mean square error (MMSE), etc.), beamforming, triangulation, etc. All respective paths can combined together, or various sub-combinations of paths can be made, to generate combined signal data. In some embodiments, stage 510 generates multiple combinations of signal data for different types of feature extraction, and/or transforms the signal data into another representation as a precursor to feature extraction. For example, some embodiments process the combined signal data to generate a 3 dimensional (3D) spatial profile of the target object. However, any suitable type of algorithm can be used to generate a transformed view or version of the raw data, such as an I/Q transformation that yields a complex vector containing phase and amplitude information related to the target object, a beamforming transformation that yields a spatial representation of target objects within range of a gesture sensor device, a Range-Doppler algorithm that yields target velocity and direction, a Range profile algorithm that yields target recognition information, a Micro-Doppler algorithm that yields high-resolution target recognition information, a Spectogram algorithm that yields a visual representation of the corresponding frequencies, and so forth. As described above, raw data can be processed in several ways to generate several transformations or combined signal data. At times, the same data can be analyzed or transformed in multiple ways. For instance, a same capture of raw data can be processed to generate a 3D profile, target velocity information, and target directional movement information. In addition to generating transformations of the raw data, stage 510 can perform basic classification of the target object, such as identifying information about its presence, a shape, a size, an orientation, a velocity over time, and so forth. For example, some embodiments use stage 510 to identify a basic orientation of a hand by measuring an amount of reflected energy off of the hand over time. These transformations and basic classifications can be performed in hardware, software, firmware, or any suitable combination. At times, the transformations and basic classifications are performed by digital signal processing component 212 and/or machine-learning component 214 of FIG. 2. In some cases, stage 510 automatically transforms the raw data or performs a basic classification based upon default parameters, while in other cases the transformations or classifications are modifiable, such as through gesture sensor APIs 208 of FIG. 2.

Stage 512 receives the transformed representation of the data from stage 510, and extracts or identifies feature(s) using the data. At times, feature extraction builds upon a basic classification identified in stage 510. Consider the above example in which stage 510 classifies a target object as a hand. Stage 512 can build from this basic classification to extract lower resolution features of the hand. In other words, if stage 512 is provided information identifying the target object as a hand, then stage 512 uses this knowledge to look for hand-related features (i.e., finger tapping, shape gestures, swipe movements, etc.) instead of head-related features, (i.e., an eye blink, mouthing a word, a head-shaking movement, etc.). As another example, consider a scenario where stage 510 transforms the raw signal data into a measure of the target object's velocity-over-time. In turn, this information can used by stage 512 to identify a finger fast-tap motion by using a threshold value to compare the target object's velocity of acceleration to the threshold value, a slow-tap feature, and so forth. Any suitable type of algorithm can be used to extract a feature, such as machine-learning algorithms implemented by machine-learning component 214, and/or digital signal processing algorithms implemented by digital signal processing component 212 of FIG. 2. Some embodiments simply apply a single algorithm to extract, identify, or classify a feature, while other embodiments apply multiple algorithms to extract a single feature or multiple features. Thus, different algorithms can be applied to extract different types of features on a same set of data, or different sets of data. In some cases, stage 512 searches for a default feature using default algorithm(s), while in other cases the applied algorithms and/or the feature being searched for is modifiable, such as through gesture sensor APIs 208 of FIG. 2.

Using feature extraction information generated by stage 512, stage 514 performs gesture recognition. For instance, consider a case where a finger tap feature has been extracted. Stage 514 uses this information to identify the feature as a double-click micro-gesture. At times, gesture recognition can be a probabilistic determination of which gesture has most likely occurred based upon the input information and how this information relates to one or more previously learned characteristics or features of various gestures. For example, a machine-learning algorithm can be used to determine how to weight various received characteristics to determine a likelihood these characteristics correspond to particular gestures (or components of the gestures). As in the case above, some embodiments apply a single algorithm to recognize a gesture, while other embodiments apply multiple algorithms to identify a single gesture or multiple gestures. This can include micro-gestures or macro-gestures. Further, any suitable type of algorithm can be used to identify a gesture, such as machine-learning algorithms implemented by machine-learning component 214, and/or digital signal processing algorithms implemented by digital signal processing component 212 of FIG. 2. In some cases, stage 514 uses default algorithm(s) to identify a gesture, while in other cases the applied algorithms and/or the gesture being identified is modifiable, such as through gesture sensor APIs 208 of FIG. 2.

Stage 516 filters output information generated by stage 514 and tracks this information over time. Referring back to the above example of identifying a finger tap micro-gesture, consider now the finger tap micro-gesture being performed (and identified) repeatedly. Depending upon the configuration of stage 514, stage 516 might receive multiple notifications when the micro-gesture is repeatedly identified. However, some recipients looking for a notification of a finger-tap micro-gesture might desire to be notified once when the finger tapping starts, and then a second time when the finger tapping stops. Thus, stage 516 can receive multiple input notifications, where each input notification corresponds to a respective instance of a (same) micro-gesture has been identified, and then filter the multiple input notifications into one output notification. Alternately or additionally, stage 516 can forward each input notification as respective output notifications. At times, stage 516 filters input information from stage 514 according to a set of parameters. In some embodiments, stage 516 filters the identifications or notifications using default parameters, while in other embodiments the filtering parameters are modifiable, such as through gesture sensor APIs 208 of FIG. 2.

Pipeline 500 provides an ability to detect micro-gestures (or macro-gestures) through the use of multiple antenna. This can include movements based on portions of a target object, rather than the whole target object. Consider again the example case of a target object that is a hand. On a whole, the hand, or portions of the hand, can be in a stationary position while other portions of the hand, such as one or more fingers, are moving. The above described techniques can be used to not only identify a stationary hand, but portions of the hand that are moving, such as two fingers rubbing together. Thus, a micro-gesture can entail identifying a first portion of the hand as being stationary, and identifying a second portion of the hand as having movement relative to the stationary portion. Using multiple antenna allows for the transmission of multiple RF signals, each with different configurations. In turn, when these signals reflect off a target object, different information can be extracted from each respective reflection, thus providing multiple "vantage point views" of a same target. When the analyzed together on a whole, these different views of the same target provide enough resolution to identify micro-gestures, as well as other types of gestures. For instance, a one antenna system cannot recognize a target object moving towards or away from the antenna due to the angular distance of the target object changing. However, in the same one antenna system, it becomes difficult to detect a horizontal, left to right movement across the sensor. Conversely, a multiple antenna system provides enough diversity in the various signals to make both types of directional detections. Accordingly, when pipeline 500 receives reflections of these various signals, the various stages extract different levels of resolution in the information. The first stage starts with a raw captured signal, then generates a transformed version of the raw signal. The transformed version can be used to extract a basic classification, which can then be used to extract higher-resolution feature identifications or classifications. A final stage can then be used to filtered notification outputs of the various feature identifications. Thus, pipeline 500 extracts information from each respective incoming signal, and combines the extracted information from each respective incoming signal to improve the micro-gesture identification process.

Figure 6:
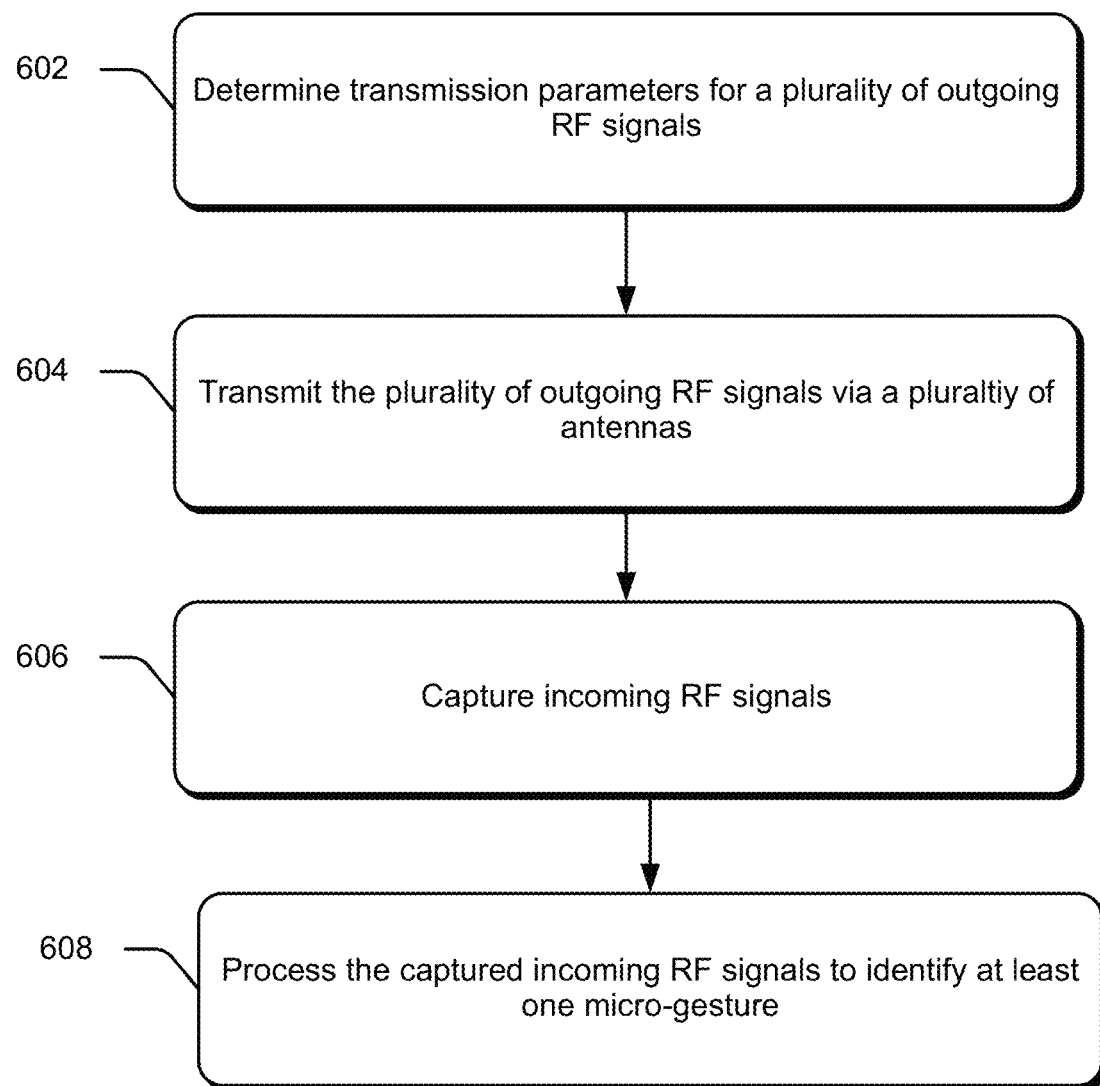
FIG. 6 illustrates an example flow diagram in accordance with one or more embodiments.

FIG. 6 is a flow diagram that describes steps in a method in accordance with one or more embodiments. The method can be implemented in connection with any suitable hardware, software, firmware, or combination thereof. In at least some embodiments, the method can be implemented by a suitably-configured system, such gesture sensor component 106 of FIGS. 1 and 2.

Step 602 determines transmission parameters for a plurality of outgoing RF signals. In some embodiments, transmission parameters for each respective outgoing RF signal are determined independently from one another, while in other embodiments, the transmission parameters for each respective outgoing RF signal are determined in dependence of one another to form a specific transmission pattern or specific diversity scheme, as further described above. The determination can be based upon an expected target object type, an expected operating environment, available hardware, anticipated feature or micro-gesture, expected feature-extraction algorithm, and so forth. In some cases, one or more gesture sensor APIs can be used to configure some or all of the transmission parameters for each outgoing RF signals.

Responsive to determining the transmission parameters, step 604 transmits the plurality of outgoing RF signals using the determined transmission parameters, such as by transmitting each respective outgoing RF signal on a respective antenna. In some embodiments, the direction of the transmissions can be based upon an expected location of a target object Step 606 captures incoming RF signals, such as RF signals reflected of the target object, using at least one antenna. As further described above, reflected RF signals originate from at least some of the plurality of transmitted RF contacting or connecting with a target object. While this example describes reflected signals, it is to be appreciated that other forms of signals can be captured, such as diffracted waves, refracted waves, scattered waves, and so forth. At times, all of the reflected RF signals are captured, while other times simply a portion of the RF signals are captured. Capturing an RF signal entails receiving at least a portion of the incoming RF signals using at least one antenna, but multiple antenna can be used. In some embodiments, capturing the reflected RF signals also includes digitizing the signals through a sampling process.

Responsive to capturing the incoming RF signals, step 608 processes the captured incoming RF signals to identify at least one micro-gesture or feature. For example, the processing can involve multiple stages of a pipeline, such as pipeline 500 of FIG. 5. The processing can be based upon a type of expected micro-gesture or feature (i.e., the type drives the processing algorithms used). In some embodiments, the processing extracts information at multiple levels of resolution, where each stage of processing refines or extracts information at a finer level of resolution than a previous stage. For instance, a first stage of the processing can extract a first set of information about the target object at a first level of resolution, such as classifying the target object as a hand. This first set of information can then be used as input to a second stage of processing. In turn, the second stage extracts a second level of information about the target object from the first set of information at a finer level of resolution that the first level of information, such as extracting a micro-gesture from multiple hand-related micro-gestures, and so forth. Alternately or additionally, the processing can include filtering an output based upon parameters, such as filtering how often notifications are sent when a micro-gesture has been detected.

Having considered various embodiments, consider now an example system and device that can be utilized to implement the embodiments described above.

Example Electronic Device

Figure 7:
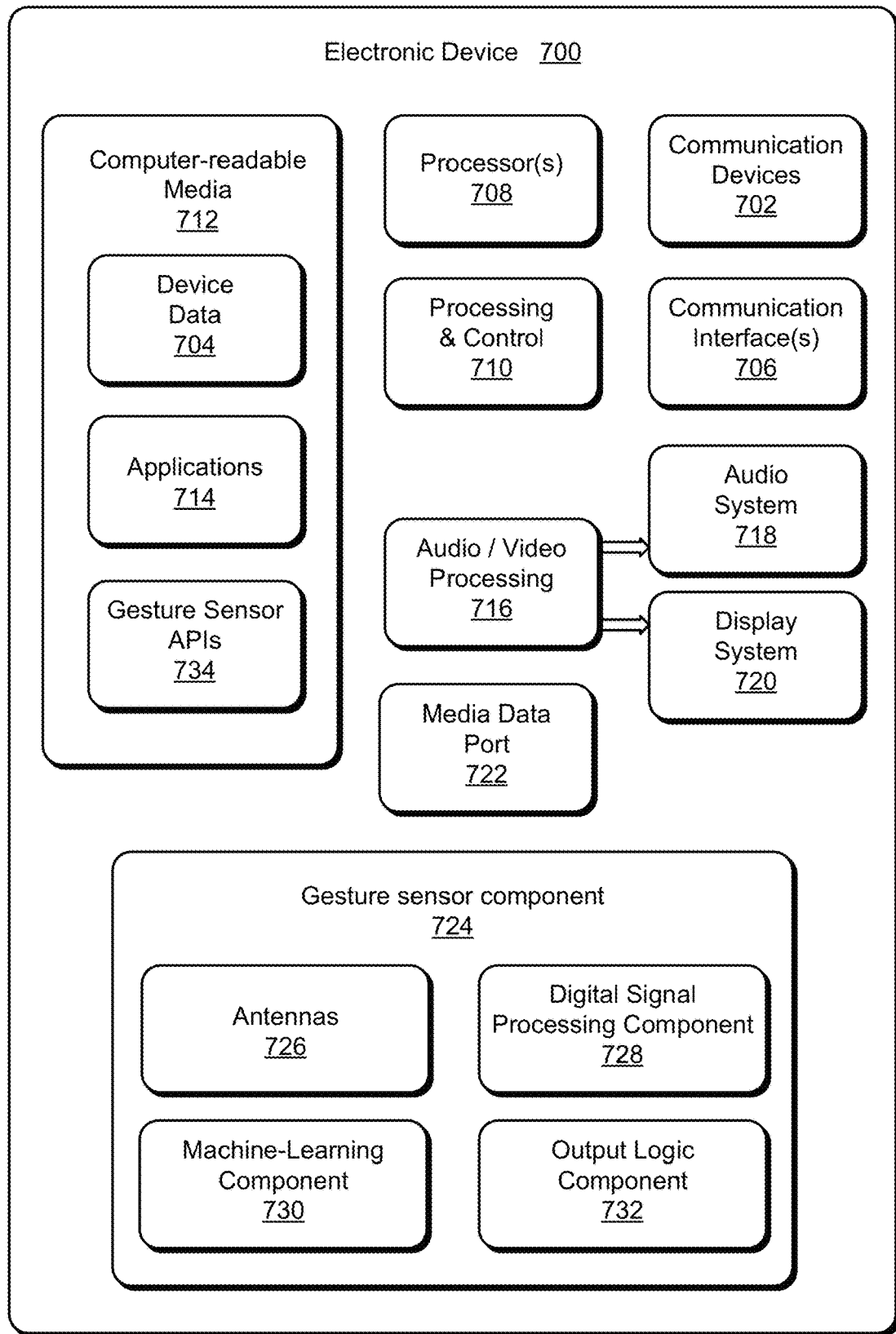
FIG. 7 illustrates an example device in which micro-gesture hand detection can be employed in accordance with one or more embodiments.

FIG. 7 illustrates various components of an example electronic device 700 that incorporates micro-gesture recognition using wireless techniques as describe with reference to FIGS. 1-6. Electronic device 700 may be implemented as any type of a fixed or mobile device, in any form of a consumer, computer, portable, user, communication, phone, navigation, gaming, audio, camera, messaging, media playback, and/or other type of electronic device, such as computing device 102 described with reference to FIGS. 1 and 2. In light of this, it is to be appreciated that various alternate embodiments can include additional components that are not described, or exclude components that are described, with respect to electronic device 700.

Electronic device 700 includes communication devices 702 that enable wired and/or wireless communication of device data 704 (e.g., received data, data that is being received, data scheduled for broadcast, data packets of the data, etc.). The device data 704 or other device content can include configuration settings of the device and/or information associated with a user of the device.

Electronic device 700 also includes communication interfaces 706 that can be implemented as any one or more of a serial and/or parallel interface, a wireless interface, any type of network interface, a modem, and as any other type of communication interface. The communication interfaces 706 provide a connection and/or communication links between electronic device 700 and a communication network by which other electronic, computing, and communication devices communicate data with electronic device 700.

Electronic device 700 includes one or more processors 708 (e.g., any of microprocessors, controllers, and the like) which process various computer-executable instructions to control the operation of electronic device 700 and to implement embodiments of the techniques described herein. Alternatively or in addition, electronic device 700 can be implemented with any one or combination of hardware, firmware, or fixed logic circuitry that is implemented in connection with processing and control circuits which are generally identified at 710. Although not shown, electronic device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Electronic device 700 also includes computer-readable media 712, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewritable compact disc (CD), any type of a digital versatile disc (DVD), and the like.

Computer-readable media 712 provides data storage mechanisms to store the device data 704, as well as various applications 714 and any other types of information and/or data related to operational aspects of electronic device 700. The applications 714 can include a device manager (e.g., a control application, software application, signal processing and control module, code that is native to a particular device, a hardware abstraction layer for a particular device, etc.).

Electronic device 700 also includes audio and/or video processing system 716 that processes audio data and/or passes through the audio and video data to audio system 718 and/or to display system 720 (e.g., a screen of a smart phone or camera). Audio system 718 and/or display system 720 may include any devices that process, display, and/or otherwise render audio, video, display, and/or image data. Display data and audio signals can be communicated to an audio component and/or to a display component via an RF link, S-video link, HDMI, composite video link, component video link, DVI, analog audio connection, or other similar communication link, such as media data port 722. In some implementations, audio system 718 and/or display system 720 are external components to electronic device 700. Alternatively or additionally, display system 720 can be an integrated component of the example electronic device, such as part of an integrated touch interface.

Electronic device 700 also includes gesture sensor component 724 that wirelessly identifies one or more features of a target object, such as a micro-gesture performed by a hand as further described above. Gesture sensor component 724 can be implemented as any suitable combination of hardware, software, firmware, and so forth. In some embodiments, gesture sensor component 724 is implemented as an SoC. Among other things, gesture sensor component 724 includes antennas 726, digital signal processing component 728, machine-learning component 730, and output logic component 732.

Antennas 726 transmit and receive RF signals under the control of gesture sensor component. Each respective antenna of antennas 726 can correspond to a respective transceiver path internal to gesture sensor component 724 that physical routes and manages outgoing signals for transmission and the incoming signals for capture and analysis as further described above.

Digital signal processing component 728 digitally processes RF signals received via antennas 726 to extract information about the target object. This can be high-level information that simply identifies a target object, or lower level information that identifies a particular micro-gesture performed by a hand. In some embodiments, digital signal processing component 728 additionally configures outgoing RF signals for transmission on antennas 726. Some of the information extracted by digital signal processing component 728 is used by machine-learning component 730. Digital signal processing component 728 at times includes multiple digital signal processing algorithms that can be selected or deselected for an analysis, examples of which are provided above. Thus, digital signal processing component 728 can generate key information from RF signals that can be used to determine what gesture might be occurring at any given moment.

Machine-learning component 730 receives input data, such as a transformed raw signal or high-level information about a target object, and analyzes the input date to identify or classify various features contained within the data. As in the case above, machine-learning component 730 can include multiple machine-learning algorithms that can be selected or deselected for an analysis. Among other things, machine-learning component 730 can use the key information generated by digital signal processing component 728 to detect relationships and/or correlations between the generated key information and previously learned gestures to probabilistically decide which gesture is being performed.

Output logic component 732 logically filters output information generated by digital signal processing component 728 and/or machine-learning component 730. Among other things, output logic component 732 identifies when received information is redundant, and logically filters the redundancy out to an intended recipient.

Electronic device 700 also includes gesture sensor APIs 734, which are illustrated as being embodied on computer-readable media 712. Gesture sensor APIs 734 provide programmatic access to gesture sensor component 724, examples of which are provided above. The programmatic access can range from high-level program access that obscures underlying details of how a function is implemented, to low-level programmatic access that enables access to hardware. In some cases, gesture sensor APIs can be used to send input configuration parameters associated with modifying operation of digital signal processing component 728, machine-learning component 730, output logic component 732, or any combination thereof, examples of which are provided above.

CONCLUSION

Various embodiments wirelessly detect micro gestures using multiple antenna of a gesture sensor device. At times, the gesture sensor device transmits multiple outgoing radio frequency (RF) signals, each outgoing RF signal transmitted via a respective antenna of the gesture sensor device. The outgoing RF signals are configured to help capture information that can be used to identify micro-gestures performed by a hand. The gesture sensor device captures incoming RF signals generated by the outgoing RF signals reflecting off of the hand, and then analyzes the incoming RF signals to identify the micro-gesture.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. A method comprising:
receiving, by a computing device, a plurality of incoming radio frequency (RF) signals generated by at least one outgoing RF signal reflecting off two or more portions of a user;
processing, by the computing device, a set of data originating from the incoming RF signals to extract information about movements of each of the portions of the user;
determining, by the computing device and based on the information about the movements of each of the portions of the user, a relative movement between the portions of the user; and
processing, by the computing device, the relative movement between the portions of the user to identify a gesture performed by at least one of the portions of the user.

2. The method of claim 1, wherein:
the set of data comprises raw data; and
the processing the set of data comprises applying at least one beamforming technique on the raw data.

3. The method of claim 1, further comprising:
generating, by the computing device, raw data corresponding to the incoming RF signals; and
transforming, by the computing device, the raw data into at least one transformation,
wherein:
the transformation comprises one or more of:
an I/Q transformation that yields one or more complex vectors containing phase and amplitude information,
a beamforming transformation that yields a spatial representation of the portions of the user,
a range-Doppler transformation that yields velocity and direction information about the portions of the user,
a range profile transformation that yields recognition information about the portions of the user,
a micro-Doppler transformation that yields high-resolution recognition information about the portions of the user, or
a spectrogram transformation that represents corresponding frequencies of the incoming RF signals; and
the set of data comprises the transformation.

4. The method of claim 1, wherein the processing the set of data comprises first processing the set of data at a coarser resolution and subsequently processing the set of data at a finer resolution.

5. The method of claim 1, wherein the set of data includes Doppler information about each of the portions of the user over time.

6. The method of claim 1, wherein the set of data further includes information about millimeter-scale movement of the portions of the user.

7. The method of claim 6, wherein the set of data further includes information about millimeter-scale movement of the portions of the user.

8. The method of claim 1, wherein the portions of the user comprise respective fingers of a hand of the user.

9. The method of claim 8, wherein the gesture comprises the hand of the user forming a certain shape.

10. The method of claim 9, wherein the gesture further comprises one or more fingers in a certain orientation relative to other parts of the hand of the user.

11. A device configured to identify a relative-movement gesture performed by a target object, the device comprising:
a processor; and
a computer-readable media comprising instructions that, when executed by the processor, cause the device to:
receive a plurality of incoming radio frequency (RF) signals generated by at least one outgoing RF signal reflecting off the target object;
generate signal data corresponding to the incoming RF signals;
determine, based on the signal data, that the target object has performed the relative-movement gesture, the relative-movement gesture comprising a portion of the target object moving relative to another portion of the target object; and
output an indication of the relative-movement gesture.

12. The device of claim 11, wherein the device comprises a smartphone.

13. The device of claim 11, wherein the instructions further cause the device to transmit the at least one outgoing RF signal using one or more of: time diversity, frequency diversity, or spatial diversity.

14. The device of claim 11, wherein:
the instructions further cause the processor to receive a plurality of other incoming RF signals generated by one or more other outgoing RF signals reflecting off the target object at respective previous times;
the generation of the signal data comprises generating signal data for the incoming RF signals and other signal data for the other incoming RF signals; and
the determination that the target object has performed the relative-movement gesture is based further on the other signal data.

15. The device of claim 11, further comprising a plurality of receive antennas, wherein:
the receipt of the incoming RF signals comprises receiving the incoming RF signals via respective ones of the receive antennas; and
the generation of the signal data comprises applying at least one beamforming technique on the incoming RF signals.

16. The device of claim 11, wherein the determination that the target object has performed the relative-movement gesture is based further on millimeter-scale movement of portions of the target object.

17. The device of claim 16, wherein the determination that the target object has performed the relative-movement gesture is based further on determining that the millimeter-scale movement of the portions of the target object corresponds to a transformation of the target object into a physical configuration or shape.

18. The device of claim 11, wherein the target object is a hand.

19. The device of claim 18, wherein the relative-movement gesture comprises one or more fingers of the hand moving, or in a certain orientation, relative to other parts of the hand.

20. The device of claim 18, wherein the relative-movement gesture comprises a finger of the hand forming a shape.

21. A device configured to identify a relative-movement gesture performed by a target object, the device comprising:
a processor; and
a computer-readable media comprising instructions that, when executed by the processor, cause the device to:
receive a plurality of incoming radio frequency (RF) signals generated by at least one outgoing RF signal reflecting off the target object;
generate signal data corresponding to the incoming RF signals;
determine, based on the signal data and using at least one machine-learning algorithm, that the target object has performed the relative-movement gesture, the relative-movement gesture comprising a portion of the target object moving relative to another portion of the target object; and
output an indication of the relative-movement gesture.

22. The device of claim 21, wherein the machine-learning algorithm is trained using other signal data corresponding to other instances of the relative-movement gesture.

23. The device of claim 21, wherein the machine-learning algorithm comprises one or more of a Random Forrest algorithm, a deep learning algorithm, an artificial neural network algorithm, a convolutional neural net algorithm, a clustering algorithm, or a Bayesian algorithm.

24. The device of claim 21, wherein:
the signal data comprises raw data;
the instructions further cause the device to transform, using at least one other machine-learning algorithm, the signal data into a different representation; and
the determination that the target object has performed the relative-movement gesture is based further on the different representation.

25. The device of claim 21, wherein:
the target object is a hand; and
the relative-movement gesture further comprises one or more fingers of the hand moving relative to other parts of the hand.

26. The device of claim 21, wherein:
the signal data comprises raw data;
the instructions further cause the device to transform the signal data into a different representation;
the different representation comprises one or more of:
an I/Q transformation that yields one or more complex vectors containing phase and amplitude information,
a beamforming transformation that yields a spatial representation of the target object,
a range-Doppler transformation that yields velocity and direction information about the target object,
a range profile transformation that yields recognition information about the target object,
a micro-Doppler transformation that yields high-resolution recognition information about the target object, or
a spectrogram transformation that represents corresponding frequencies of the incoming RF signals; and
the determination that the target object has performed the relative-movement gesture comprises inputting the different representation into the at least one machine-learning algorithm.

27. The device of claim 21, wherein the relative-movement gesture is three-dimensional.

28. The device of claim 21, wherein the determination that the target object has performed the relative-movement gesture comprises:
determining, using a first stage, a classification of the target object; and
determining, using a second stage, that the target object has performed the relative-movement gesture.

29. The device of claim 28, wherein the second stage is based on the classification of the target object.

30. The device of claim 28, wherein the classification of the target object comprises a classification of the target object as a certain body part.

31. A device configured to identify a relative-movement gesture performed by a target object, the device comprising:
at least one transmit antenna;
a plurality of receive antennas;
a processor; and
a computer-readable media comprising instructions that, when executed by the processor, cause the device to:
receive a plurality of incoming radio frequency (RF) signals generated by at least one outgoing RF signal reflecting off the target object, each of the incoming RF signals received by one of the receive antennas;
generate signal data corresponding to the incoming RF signals;
determine, based on the signal data, that the target object has performed the relative-movement gesture, the relative-movement gesture comprising a first portion of the target object moving relative to a second portion of the target object; and
output an indication of the relative-movement gesture.

32. The device of claim 31, wherein the receive antennas are spatially distributed to support triangulation between the device and the first and second portions of the target object.

33. The device of claim 31, wherein:
the instructions further cause the device to determine a spatial profile of the target object; and
the determination that the target object has performed the relative-movement gesture is based further on the spatial profile of the target object.

34. The device of claim 33, wherein the at least one transmit antenna comprises a plurality of transmit antennas.

35. The device of claim 34, wherein the instructions further cause the device to transmit the at least one outgoing RF signal using constructive or destructive interference.

36. The device of claim 31, wherein:
the signal data comprises raw data;
the instructions further cause the device to transform the signal data into a different representation;
the different representation comprises one or more of:
an I/Q transformation that yields one or more complex vectors containing phase and amplitude information,
a beamforming transformation that yields a spatial representation of the target object,
a range-Doppler transformation that yields velocity and direction information about the target object,
a range profile transformation that yields recognition information about the target object,
a micro-Doppler transformation that yields high-resolution recognition information about the target object, or
a spectrogram transformation that represents corresponding frequencies of the incoming RF signals; and
the determination that the target object has performed the relative-movement gesture is based further on the different representation.

37. The device of claim 36, wherein the relative-movement gesture comprises a swipe or tap gesture.

38. The device of claim 31, wherein the signal data comprises respective signal data for the first and second portions of the target object.

39. The device of claim 38, wherein the signal data comprises movement information corresponding to the first and second portions of the target object.

40. The device of claim 39, wherein:
the target object is a hand;
the first and second portions of the target object are respective fingers of the hand; and
the relative-movement gesture comprises a movement between the fingers of the hand.

* * * * *